United States Patent
Cheng et al.

(10) Patent No.: US 11,120,800 B1
(45) Date of Patent: Sep. 14, 2021

(54) EVENT BASED FEATURE COMPUTATION

(71) Applicant: Amazon Technologies, Inc., Seattle, WA (US)

(72) Inventors: Timothy Kay Cheng, Bellevue, WA (US); Scott G. LeBaron, Edmonds, WA (US); Carl Joshua Dell, Seattle, WA (US); Marcio Furlani Carmona, Seattle, WA (US); Nitin Tak, Seattle, WA (US); Anand Vishwanath Suvarnkar, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 164 days.

(21) Appl. No.: 16/580,983

(22) Filed: Sep. 24, 2019

(51) Int. Cl.
*G10L 15/22* (2006.01)
*G06N 20/00* (2019.01)
*G10L 15/26* (2006.01)

(52) U.S. Cl.
CPC ............. *G10L 15/22* (2013.01); *G06N 20/00* (2019.01); *G10L 15/26* (2013.01)

(58) Field of Classification Search
CPC ............. G10L 15/22; G10L 15/1822; G10L 2015/223; G10L 2015/228
See application file for complete search history.

(56) References Cited

U.S. PATENT DOCUMENTS

| | | | |
|---|---|---|---|
| 10,395,655 B1* | 8/2019 | Kumar | G10L 15/14 |
| 10,497,361 B1* | 12/2019 | Rule | G10L 13/00 |
| 2003/0101060 A1* | 5/2003 | Bickley | G10L 15/08 |
| | | | 704/275 |
| 2010/0246799 A1* | 9/2010 | Lubowich | G10L 15/183 |
| | | | 379/265.09 |
| 2012/0265528 A1* | 10/2012 | Gruber | G10L 15/183 |
| | | | 704/235 |
| 2017/0169816 A1* | 6/2017 | Blandin | G10L 15/08 |
| 2017/0359707 A1* | 12/2017 | Diaconu | H04W 4/16 |

* cited by examiner

*Primary Examiner* — Jialong He
(74) *Attorney, Agent, or Firm* — Pierce Atwood, LLP

(57) ABSTRACT

Techniques for performing feature computation are described. A system may gather and analyze event data to generate a timeline of the event data and corresponding feature data (e.g., statistical values representing the event data). The system can create a customized timeline that allows information to be sorted and aggregated in different timescales to improve speech processing and other functionality. For example, a feature computation system may calculate statistics and other information based on interactions with a speech processing system. These statistics provide information about previous interactions that may be leveraged to interpret future voice commands.

20 Claims, 13 Drawing Sheets

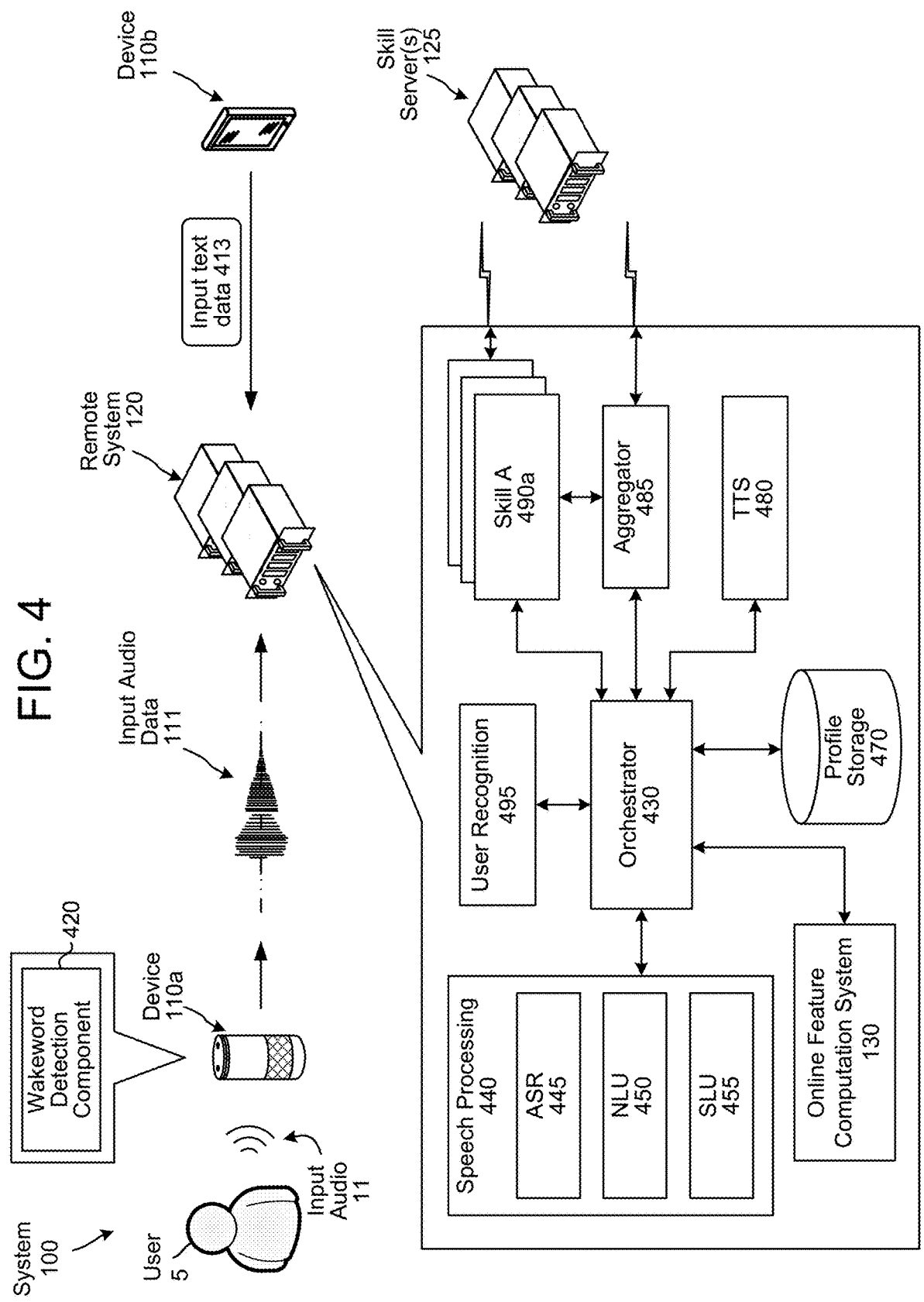

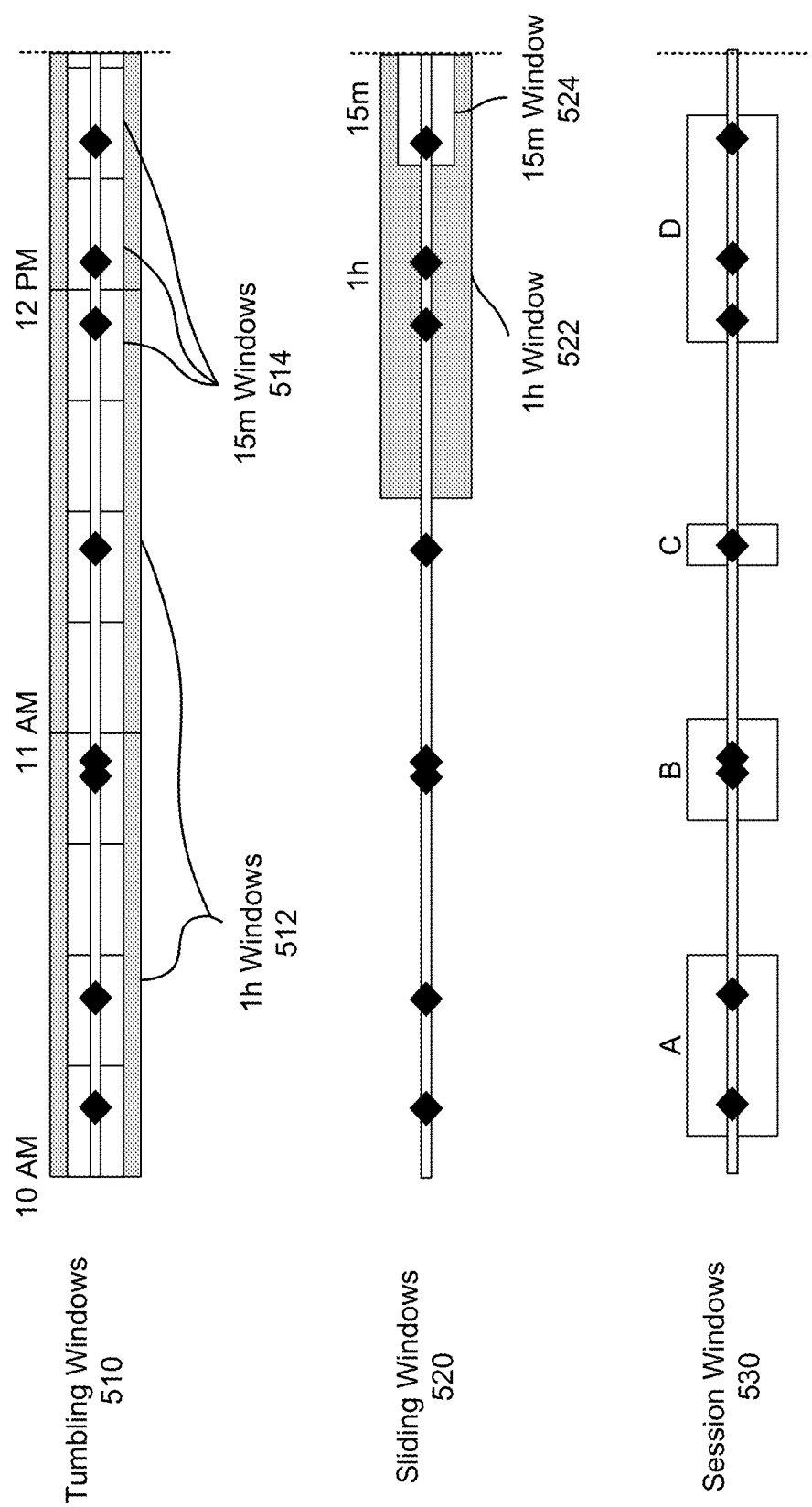

First Order Query Results 652
{
"00" ; 1,
"15" ; 3,
"30" ; 6,
"45" ; 2
}

Higher Order Query Results 662    12

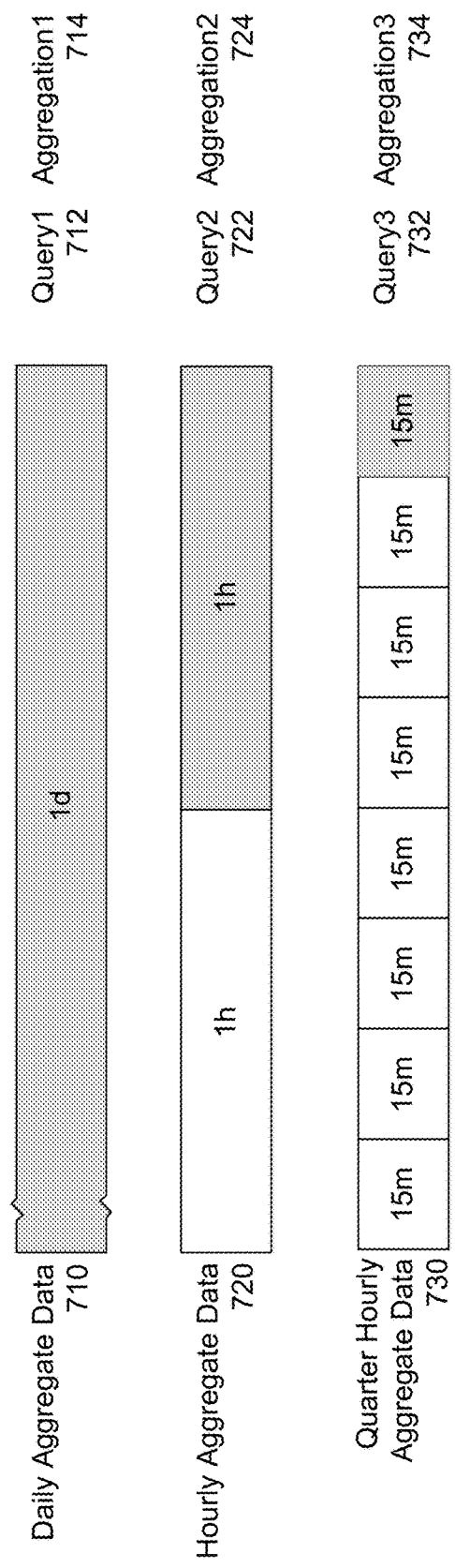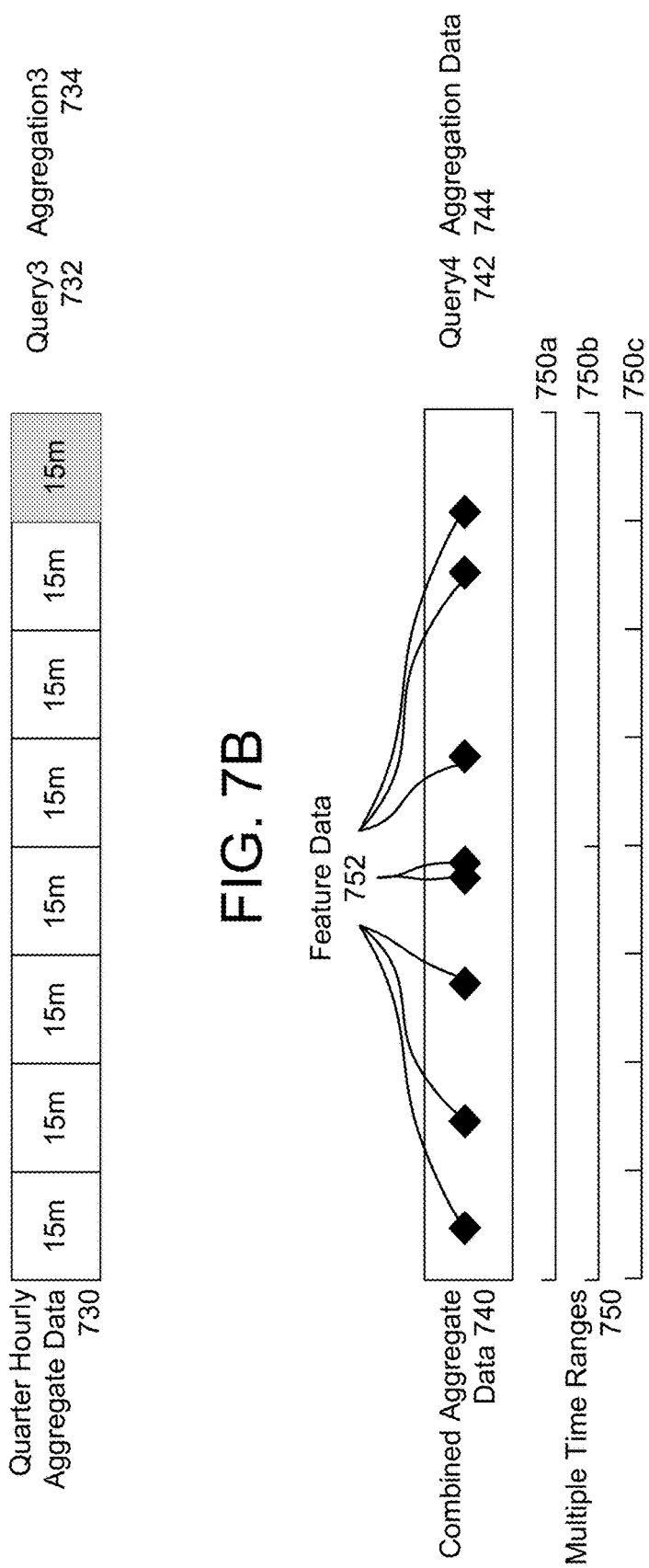

EVENT BASED FEATURE COMPUTATION

BACKGROUND

With the advancement of technology, the use and popularity of electronic devices has increased considerably. Electronic devices are commonly used to capture and send audio data.

BRIEF DESCRIPTION OF DRAWINGS

For a more complete understanding of the present disclosure, reference is now made to the following description taken in conjunction with the accompanying drawings.

FIG. 4 is a conceptual diagram of components of a speech processing system according to embodiments of the present disclosure.

FIG. 5 illustrates examples of timers and corresponding windows according to embodiments of the present disclosure.

FIGS. 7A-7B illustrate examples of storing feature data and performing queries according to embodiments of the present disclosure.

DETAILED DESCRIPTION

Electronic devices are commonly used to capture and send audio data. For example, electronic devices may generate audio data corresponding to a voice command and a remote system may process the audio data to identify the voice command and perform an action corresponding to the voice command. To assist the remote system in interpreting the voice command, the remote system may store a timeline of interactions (e.g., previous voice commands or other inputs) and perform feature computation to generate features that represent statistical values associated with the interactions. The remote system may use these features when processing future requests (e.g., voice commands) to improve a user experience.

Figure 1:
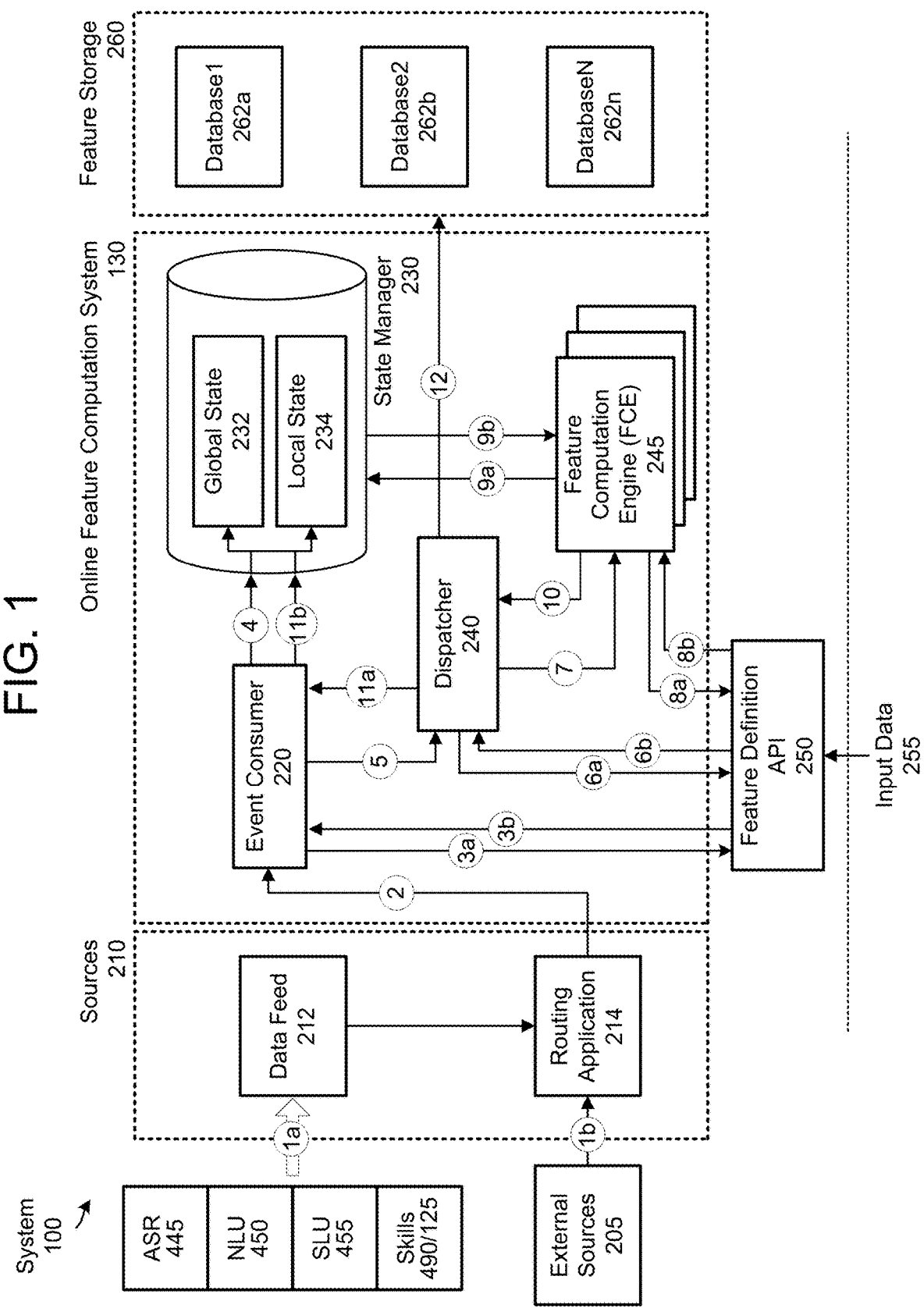
FIG. 1 illustrates an example component diagram of a feature computation system according to embodiments of the present disclosure.

FIG. 1 illustrates an example component diagram of a feature computation system according to embodiments of the present disclosure. Although the figures and discussion of the present disclosure illustrate certain operational steps of the system in a particular order, the steps described may be performed in a different order (as well as certain steps removed or added) without departing from the intent of the disclosure.

A system 100 may offer a variety of services and functionality to user 5. For example, the user 5 may request information or news, instruct the system 100 to play music or other audio using loudspeaker(s), may initiate or accept a communication session with a remote device, and/or the like. The user 5 may interact with the system 100 using a variety of input devices, such as a speech-enabled device that captures audio data corresponding to a voice command, a touchscreen-enabled device that receives input on a touchscreen of the device, a computing device connected to input devices (e.g., mouse, keyboard, touch pad, etc.), and/or the like. While interacting with the user 5, the system 100 may interpret current commands (e.g., determine an intent and/or action to perform associated with a voice command), anticipate future commands, provide information relevant to a current activity, and/or the like. To improve a user experience, the system 100 may process previous interactions with the user 5 to improve an accuracy of future predictions (e.g., interpreting commands, providing relevant information, etc.).

Each interaction between the user 5 and the system 100 corresponds to an event. In this context, an "event" may correspond to an activity of an individual user profile and/or account, such as an interaction with a remote system 120 in the form of a voice command. For example, a first voice command may correspond to a first event, a second voice command may correspond to a second event, and so on. However, the disclosure is not limited thereto and events may correspond to non-voice interactions with the system 100 without departing from the disclosure. For example, a third event may correspond to a request received from a device (e.g., touchscreen-enabled device, mobile device, computing device, and/or the like) via touch input or other input techniques without departing from the disclosure. The system 100 may represent information about the event using event data. For ease of illustration, however, "event" and "event data" may be used interchangeably without departing from the disclosure.

As used herein, a timeline of events (e.g., "timeline") may represent a series of events (e.g., continuous event stream or set of ordered events) over a period of time. For example, the timeline may be a data structure that combines event data corresponding to a plurality of events, feature response data and/or aggregate data that represent statistics corresponding to portion(s) of the event data, individual timelines that track event data associated with specific parameters (e.g., types of event, individual features, individual user profile/account, etc.), and/or the like without departing from the disclosure. Thus, an overall timeline can be split into individual timelines based on user profile, account, and/or the like. In some examples, the timeline may correspond to a single user profile (e.g., single user), although the disclosure is not limited thereto. For example, the timeline may correspond to multiple user profiles associated with the same user account or different user accounts. The system 100 may process a single timeline individually and/or process multiple timelines jointly without departing from the disclosure.

Additionally or alternatively, an overall timeline can be split into individual timelines based on a type of event, type of feature, and/or the like. To illustrate examples of a type of event, a user profile may be associated with a first timeline indicating how often the user profile plays music, a second timeline indicating how often the user profile plays music from a specific artist, a third timeline indicating how often the user profile plays a specific song, and so on. To illustrate examples of a type of feature, the user profile may be associated with a fourth timeline indicating a total number of times that the user profile plays a specific genre, a fifth timeline indicating an average number of times that the user profile plays a specific genre, a sixth timeline indicating a percentile associated with the specific genre, and so on. Thus, the system 100 may merge the individual timelines together to form a combined timeline that represents more complex events.

To improve future processing (e.g., interpreting future voice commands, predicting future actions to perform, providing relevant information, and/or the like), the system 100 may perform event based feature computation to determine relevant features and calculate feature response data associated with individual events in the timeline. For example, the system 100 may employ a fleet of hosts to process the timeline (e.g., series of events) and compute event correlation and/or aggregation over at least a portion of the stream of events.

In this context, a "feature" may correspond to specific analytical information about the timeline, such as an aggregation of similar events over a specified time range (e.g., total number of events corresponding to a particular event type, command, action to perform, etc.). For example, the system 100 may associate a type of event with one or more features and, upon processing event data associated with the event type, the system 100 may perform feature computation processing to determine feature response data corresponding to the one or more features. In some examples, a feature may indicate an aggregation or other computation to perform (e.g., feature computation, statistical analysis, and/or the like), whereas a feature response may correspond to the actual aggregated number (e.g., statistical value(s)). For ease of explanation, however, the disclosure may refer to features and feature responses interchangeably without departing from the disclosure. For example, reference to determining features for event data being processed may include the steps of identifying feature(s) that are relevant to the event data, sending the feature(s) to a feature computation engine (FCE), and receiving feature response(s) corresponding to the selected feature(s). Thus, the system 100 may determine the features by generating feature response data indicating the feature response(s) that correspond to the selected feature(s).

To illustrate a simple example, the system 100 may track a number of times that a user profile has listened to a particular song over a variety of different time ranges (e.g., 15 minutes, 1 hour, 1 day, 7 days, etc.). The aggregate number of times that the song has been listened to during each time range may correspond to individual features associated with an event, which in this case would be a request to listen to the particular song. While the example refers to tracking a number of times that a particular song has been requested, the disclosure is not limited thereto and the system 100 may track a number of times that the user profile requested to listen to any song, a particular genre, a particular artist, a particular album, and/or the like without departing from the disclosure. Additionally or alternatively, the system 100 may track any type of event, including commands to control voice-enabled devices, perform one or more actions, and/or other interactions with the remote system 120 known to one of skill in the art.

While the abovementioned examples correspond to determining features based on a total number of events, the disclosure is not limited thereto. Instead, the system 100 may determine features based on a sum of events (e.g., total number of events), an average, a standard deviation, a percentile, a top-k, and/or using any technique known to one of skill in the art without departing from the disclosure.

As used herein, the system 100 may perform feature computation processing corresponding to natural language input events. For example, the system 100 may perform feature computation using only a portion of a timeline (e.g., subset of the total number of events) that correspond to natural language inputs, such as events associated with speech input, voice commands, text input, and/or the like. However, the disclosure is not limited thereto and the system 100 may perform feature computation processing using the entire timeline without departing from the disclosure.

Thus, the system 100 may consume an event by processing the event and computing the individual features, which the system 100 may then use to interpret future voice commands. For example, the system 100 may aggregate individual events in multiple ways, generating a plurality of features that may be specific to a particular command (e.g., request to play an individual song), general to a type of command (e.g., request to play a song), and/or a combination thereof without departing from the disclosure. The system 100 may store the plurality of features in a first database associated with a single user profile/account and/or a second database associated with multiple user profiles/accounts. For example, the system 100 may maintain the first database using features extracted from a timeline associated with the user profile/account, such that the first database is personalized to the user profile/account, while also aggregating features extracted from multiple timelines and storing these aggregated features in the second database, such that the second database corresponds to global trends associated with a plurality of user profiles/accounts.

When interpreting a subsequent voice command, the system 100 may use one or more features from the first database and/or the second database as inputs to select between different intents, commands, actions to perform, and/or the like. For example, if the system 100 determines that the user profile has requested a song title by a particular artist multiple times within a recent time period (e.g., 15 minutes, one hour, etc.), the system 100 may interpret a voice command as requesting the same song instead of requesting a similar song title by a different artist. However, the disclosure is not limited thereto and the system 100 may use the one or more features to interpret the voice command using any techniques known to one of skill in the art without departing from the disclosure.

In some examples, the system 100 may use the features and/or feature response data to improve automatic speech recognition (ASR) processing, natural language understanding (NLU) processing, and/or machine learning corresponding to processing NLU data. For example, the system 100 may improve ASR processing by training an ASR hypothesis reranker component (e.g., improve how the ASR reranker component ranks and/or selects between potential ASR output data), may improve NLU processing by training an NLU reranker component (e.g., improve how the NLU reranker component ranks and/or selects between potential NLU output data), may improve machine learning processing by training a machine learning component (e.g., a rule-based machine learning component and/or a model-based machine learning component), and/or the like without departing from the disclosure.

As illustrated in FIG. 1, the system 100 may receive a stream of source events (e.g., raw event data) from sources 210, may process the stream of source events using an online feature computation system 130 to generate event data (e.g., processed event data) and corresponding feature data (e.g., statistical values corresponding to the event data), may store the event data and/or the feature data in a timeline, and may output the feature data to feature storage 260.

The sources 210 may receive ("1a") source events from a variety of components, including the ASR component 445, the NLU component 450, the SLU component 455, and/or the skills 490/125 described in greater detail below with regard to FIG. 4. Additionally or alternatively, the sources 210 may receive ("1b") source events from external sources 205, from other components within the remote system 120, and/or other services that are not illustrated in FIG. 1 without departing from the disclosure. While FIG. 1 illustrates the skill server(s) 125 as corresponding to the skills 490, the disclosure is not limited thereto and the skill server(s) 125 may be included as part of the external sources 205 without departing from the disclosure.

As illustrated in FIG. 1, the sources 210 may include a data feed component 212 that receives ("1a") the source events from the ASR 445/NLU 450/SLU 455/Skills 490 and sends the source events to a routing application 214. The routing application 214 may also receive ("1b") source events from the external sources 205. The routing application 214 sorts the source events by user profile, account, and/or the like and sends ("2") the sorted events to the online feature computation system 125.

The online feature computation system 130 includes an event consumer component 220, a state manager component 230, a dispatcher component 240, and a feature computation engine (FCE) 245. The event consumer component 220 may receive ("2") raw event data representing sorted source events for a single user profile/account and may process the raw event data. For example, the raw event data received from the sources 210 may be stored in a first format and the event consumer component 220 may process the raw event data by extracting relevant information and generating processed event data (in a second format). For example, the event consumer component 220 may receive raw event data that includes event identification, a type of event, and a payload that represents a plurality of information associated with the event as a single field or string of data. The event consumer component 220 may then process the raw event data by identifying portions of the plurality of information that correspond to individual fields or separate strings of data, separating the individual fields or strings of data into discrete objects, and generate processed event data that stores the separated fields or strings of data using uniform formatting configured for a particular timeline.

The event consumer component 220 may retrieve configuration data (e.g., timeline configuration) from a feature definition application programming interface (API) 250. For example, the event consumer component 220 may send a request ("3a") for the configuration data to the feature definition API 250 and the feature definition API 250 may send ("3b") the configuration data to the event consumer component 220. The event consumer component 220 may then use the configuration data to process the raw event data and generate the processed event data. After generating the processed event data, the event consumer component 220 may send ("4") the processed event data to the state manager component 230 and may send ("5") the processed event data to the dispatcher component 240.

The raw event data may include information associated with the source event, such as a unique identification for the source event, a label indicating a type of event, and the actual document (e.g., payload) associated with the source event. The event consumer component 220 may 'consume' the raw event data to generate processed event data corresponding to the event. For example, the processed event data may include information associated with the event such as a unique identification for the event (which may be different from the unique identification for the source event, although the disclosure is not limited thereto), a first timestamp (e.g., first time value) corresponding to a beginning of the event (or simply the event time), a second timestamp (e.g., second time value) corresponding to an ending of the event, a third timestamp corresponding to when the event was received, a type of event, and/or additional information associated with the event, although the disclosure is not limited thereto.

In some examples, the processed event data may indicate a device (e.g., invoking device), a type of device (e.g., invoking device type), a location of the device, a user profile and/or account associated with the device, user identification (e.g., identification of the user as determined using voice recognition, facial recognition, or the like), session identification, indication of an invoking voice assistant (e.g., client API used to input a requested command), indication of a skill (e.g., skill invoked by the requested command), indication of intent data (e.g., intent corresponding to the requested command), text data corresponding to an utterance representing the requested command (e.g., automatic speech recognition (ASR) data, natural language understanding (NLU) data, etc.), output data generated in response to the requested command (e.g., text data, audio data, and/or the like sent to the invoking device to generate a notification to the user), other context data (e.g., user profiles and/or devices located in proximity to the location of the device, skills active when the event was received, etc.), and/or other information associated with the event. However, the disclosure is not limited thereto and the processed event data may include a portion of the examples listed above and/or any other information known to one of skill in the art without departing from the disclosure.

To illustrate an example associated with speech processing (e.g., using natural language processing to identify a voice command and perform an action), the event consumer component 220 may process raw event data corresponding to an utterance received from a device 110. For example, the event consumer component 220 may generate processed event data that includes information associated with an NLU event, such as text data, intent data, slot data, and/or the like. In some examples, the event consumer component 220 may generate processed event data that indicates a unique identification for the event (e.g., utterance representing a voice command), a first timestamp corresponding to a beginning of the utterance (e.g., when the device 110 started to generate audio data), a second timestamp corresponding to an end of the utterance (e.g., when the device 110 stopped generating the audio data), a third timestamp corresponding to when the system 100 received the audio data from the device 110, an indication of an event type (e.g., that the event corresponds to a voice command), an indication of the invoking device (e.g., identification associated with the device 110), an indication of device type associated with the device (e.g., speech-enabled device), text data corresponding to the utterance (e.g., ASR output data), intent data corresponding to the text data (e.g., NLU output data indicating an intent associated with the command), and/or additional information corresponding to the event.

The state manager component 230 may include a global state 232 and a local state 234 and may store the processed event data to one of the global state 232 or the local state 234. For example, the event consumer component 220 may use the configuration data to determine whether to send event data corresponding to an individual event to a first timeline (e.g., global state 232) or a second timeline (e.g., local state 234). As described in greater detail above, the first timeline and/or the second timeline may comprise multiple individual timelines that are each configured for a specific type of event, type of feature, and/or the like without departing from the disclosure.

The dispatcher component 240 may receive ("5") the processed event data from the event consumer component 220, and may query the feature definition API 250 to obtain a list of features to compute for the processed event data. For example, the dispatcher component 240 may send a request ("6a") for a list of features to compute to the feature definition API 250 and the feature definition API 250 may send ("6b") the list of features to the event consumer component 220. In some examples, the dispatcher component 240 may send a portion of the event data (e.g., type of event) to the feature definition API 250 and the feature definition API 250 may retrieve the list of features corresponding to the type of event, although the disclosure is not limited thereto. The dispatcher component 240 may also receive an indication of which FCE 245 to send the list of features for feature computation processing, either directly from the feature definition API 250 in step "6b" or indirectly from the event consumer component 220 (via step "3b"), and may send ("7") the list of features to the selected FCE 245.

The selected FCE 245 may receive ("7") the list of features from the dispatcher component 240, and may query the feature definition API 250 to obtain feature definitions corresponding to the selected features. For example, the FCE 245 may send a request ("8a") for the feature definitions to the feature definition API 250 and may receive the feature definitions ("8b") from the feature definition API 250.

The feature definition API 250 is configured to instruct the online feature computation system 130 how to handle a particular event type. For example, the feature definition API 250 may receive an indication of the type of event and may determine what information to be extracted and/or new signals to be generated, which windows are relevant and/or how to draw windows for the particular event, which FCE 245 should perform the feature computation processing (e.g., generate the feature response data), where to send the feature response data (e.g., one or more components to consume the feature response data), and/or the like. Thus, the feature definition API 250 may send the configuration data to the event consumer component 220, may send the list of features to the dispatcher component 240, may send the feature definitions to the FCE 245, and/or may send additional information to other components in the online feature computation system 130 without departing from the disclosure.

While not illustrated in FIG. 1, a window evaluator component may advance individual timer(s) and/or determine to close window(s). In some examples, the window evaluator component may communicate with the feature definition API 250 to determine which windows are relevant and/or how to draw windows for a particular event, although the disclosure is not limited thereto. The window evaluator component will be described in greater detail below with regard to subsequent figures. For example, the window evaluator component may determine when to close windows, as described in greater detail below with regard to FIG. 5. Additionally or alternatively, the window evaluator component may manually advance timers, as described in greater detail below with regard to FIG. 8. In some examples, the window evaluator component may be a discrete component within the online feature computation system 130. However, the disclosure is not limited thereto and the window evaluator component may be included within the event consumer component 220 and/or the dispatcher component 240 without departing from the disclosure.

After receiving the feature definitions from the feature definition API 250, the FCE 245 may query the state manager component 230 to obtain a snapshot of the timeline (e.g., aggregation data) relevant to the features (e.g., global state 232 or the local state 234). For example, the FCE 245 may send a request ("9a") for the snapshot to the state manager component 230 and the state manager component 230 may send the snapshot and/or a portion of the timeline ("9b") to the FCE 245. In some examples, the request may indicate a time window of interest within the timeline (e.g., indicate a portion of the timeline that is relevant to the features being computed), although the disclosure is not limited thereto.

The snapshot of the timeline corresponds to a portion of the timeline that is indicated by the time window of interest, and the snapshot may be referred to as aggregation data without departing from the disclosure. In some examples, aggregation data may include previously calculated feature response data corresponding to the time window of interest, although the disclosure is not limited thereto. For example, aggregation data may include a sequence of values that indicate a total number of times that a particular type of event occurred within specific time ranges, as described in greater detail below with regard to FIGS. 6A-7B. Thus, the aggregation data may include aggregation values corresponding to a first time range (e.g., 24 hours), a second time range (e.g., 1 hour), a third time range (e.g., 15 minutes), and/or the like.

The FCE 245 may then use the features (e.g., indicated by the list of features), the feature definitions corresponding to the features, and the snapshot of the timeline (e.g., aggregation data) to compute a feature response (e.g., feature response data). For example, the FCE 245 may process the aggregation data to determine a total number of times that a particular type of event occurred within a particular time window associated with a feature, which may include summing and/or subtracting aggregation values as described in greater detail below with regard to FIG. 6B. The FCE 245 may send ("10") the feature response data to the dispatcher component 240.

The dispatcher component 240 may send ("11a") the feature response data to the event consumer component 220 and the event consumer component 220 may send ("11b") the feature response data to the state manager component 230 to store in the timeline. Thus, the state manager component 230 may store the event data along with corresponding feature response (e.g., feature response data) within a single timeline, although the timeline may be a composite of a plurality of individual timelines without departing from the disclosure. For example, each feature may be stored to a unique timeline for the user profile and the overall timeline may be comprised of the plurality of unique timelines without departing from the disclosure.

In some examples, the dispatcher component 240 may determine that the feature computation does not process properly (e.g., error or failure) and send the event data back to the event consumer component 220. The online feature computation system 130 may reprocess the event data again or may store an indication of the failure without departing from the disclosure.

The dispatcher component 240 may send ("12") the feature response data to the feature storage 260. The feature storage 260 may store the feature response data in one or more databases, represented as first database (Database1) 262a, second database (Database2) 262b, and nth database (DatabaseN) 262n. The number of databases included in the feature storage 260 may vary without departing from the disclosure.

In some examples, the feature definition API 250 may receive input data 255. For example, the system 100 may receive or generate input data 255 controlling at least one of the configuration data, the list of features to compute, and/or the feature definitions, although the disclosure is not limited thereto. The system 100 may use the feature definitions to select a particular configuration in response to an event and instruct the online feature computation system 130 how to handle a particular event type. For example, a feature definition may indicate what information or new signal(s) can be extracted or generated as a result of a particular event. Additionally or alternatively, the feature definition may describe how to draw windows for the event, such that each window can be passed to an individual FCE 245 to process the event and/or calculate a corresponding feature. The feature definitions may also indicate the individual FCE 245 to use to process the data and generate the new signal/feature response. Finally, the feature definition may also indicate where to send the results (e.g., feature response) so that the results may be consumed in one or more ways and/or by multiple downstream components.

Figure 2:
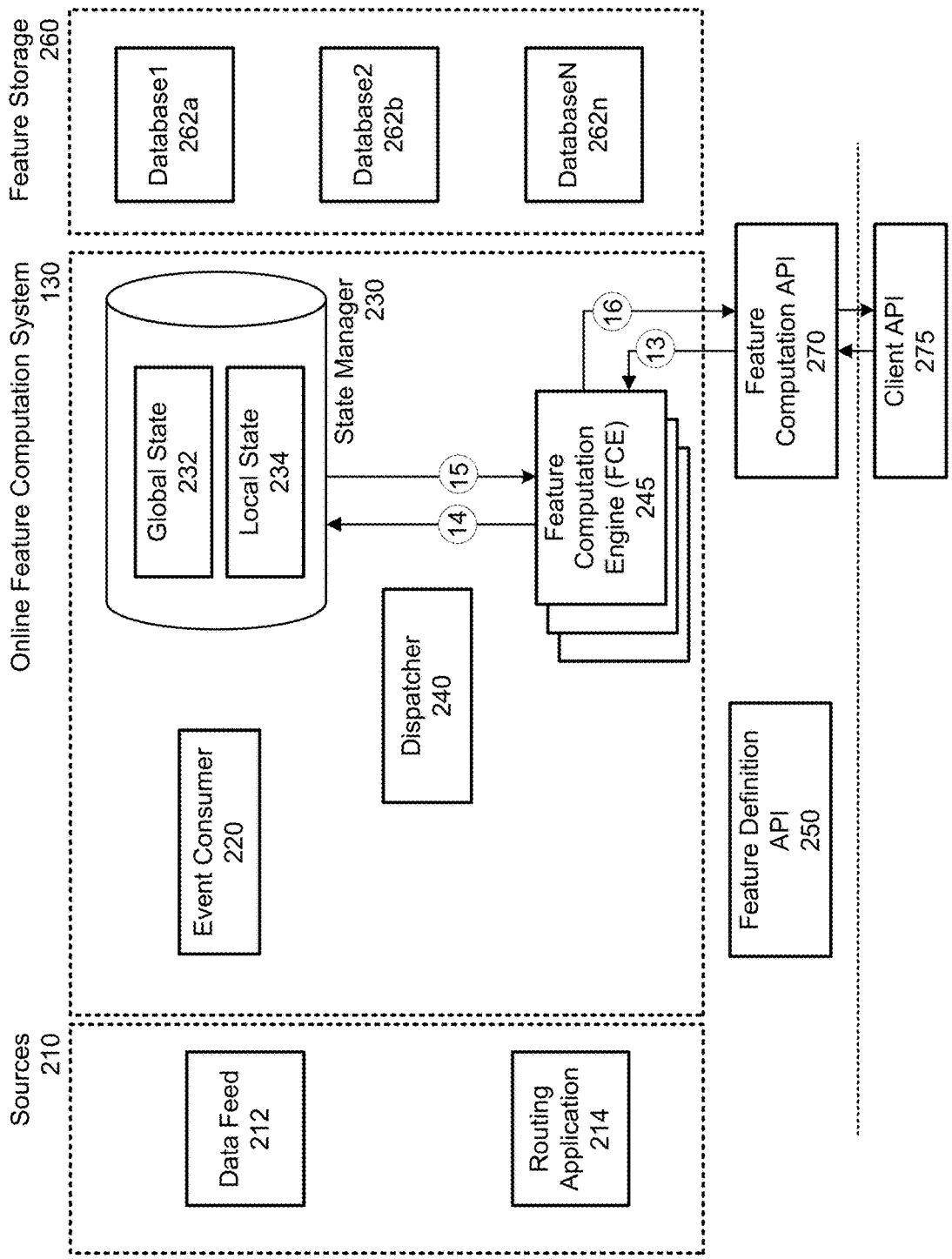
FIG. 2 illustrates an example of a feature computation system interacting with a feature computation application programming interface (API) according to embodiments of the present disclosure.

FIG. 2 illustrates an example of a feature computation system interacting with a feature computation application programming interface (API) according to embodiments of the present disclosure. In some examples, a client API 275 may send a request to a feature computation API 270 indicating a feature or a list of features to fetch and/or additional information corresponding to a particular event. For example, the client API 275 may be processing a voice command from the user 5 and may request feature response data from the online feature computation system 130 in order to improve a likelihood that the client API 275 determines a voice command matching the user's intent.

In response to receiving the request, the feature computation API 270 may retrieve feature response data (e.g., feature response(s) corresponding to the specified feature(s)) that is pre-calculated by the online feature computation system 130 and stored in the state manager 230, and may provide the feature response data to the client API 275.

As illustrated in FIG. 2, the feature computation API 270 may send ("13") a request and/or additional information to the FCE 245 indicating the feature response data that is being requested by the client API 275 (e.g., feature response data relevant to a current voice command or the like). The FCE 245 may send a request ("14") to the state manager component 230 for the feature response data and the state manager component 230 may send ("15") the feature response data to the FCE 245. However, the disclosure is not limited thereto and the FCE 245 may generate feature response data without departing from the disclosure. For example, the feature response data may not be pre-computed, in which case the state manager component 230 may send relevant aggregation data to the FCE 245 and the FCE 245 may generate the feature response data corresponding to the request, as described above with regard to FIG. 1.

After receiving or determining the feature response data, the FCE 245 may send the feature response data ("16") to the feature computation API 270 and the feature computation API 270 may send the feature response data to the client API 275.

In some examples, the feature computation API 270 may perform the steps described above with regard to the FCE 245 to generate the feature response data without departing from the disclosure. For example, the feature computation API 270 may calculate feature response data as described above (e.g., querying the feature definition API 250 to obtain feature definitions, querying the state manager component 230 to obtain a snapshot of the timeline, and then computing feature response data) without departing from the disclosure.

As described above, the system 100 may perform continuous transformation to turn raw event data (e.g., raw events received from the sources 210) into processed event data that can be used by the remote system 120. For example, the system 100 may perform filtering, event correlation, signal processing, and/or any other type of transformations known to one of skill in the art to generate the processed event data that is stored in the state manager component 230. The event consumer component 220 and the dispatcher component 240 are configured to perform continuous transformation, although the disclosure is not limited thereto and other components may be used while performing continuous transformation.

Similarly, the system 100 may perform continuous aggregation to calculate statistics over a stream of events (e.g., as part of generating the timeline). As described in greater detail below with regard to FIG. 6B, the system 100 may generate feature data corresponding to first order aggregations (e.g., portion(s) of the timeline that include event data corresponding to a small duration of time, such as 15 minutes or an hour) and/or higher order aggregations (e.g., portion(s) of the timeline that include event data corresponding to longer durations of time, such as hourly, 1 day, 7 days, 30 days, and/or the like). The system 100 may generate the higher order aggregations using the first order aggregations, although the disclosure is not limited thereto.

Figure 3:
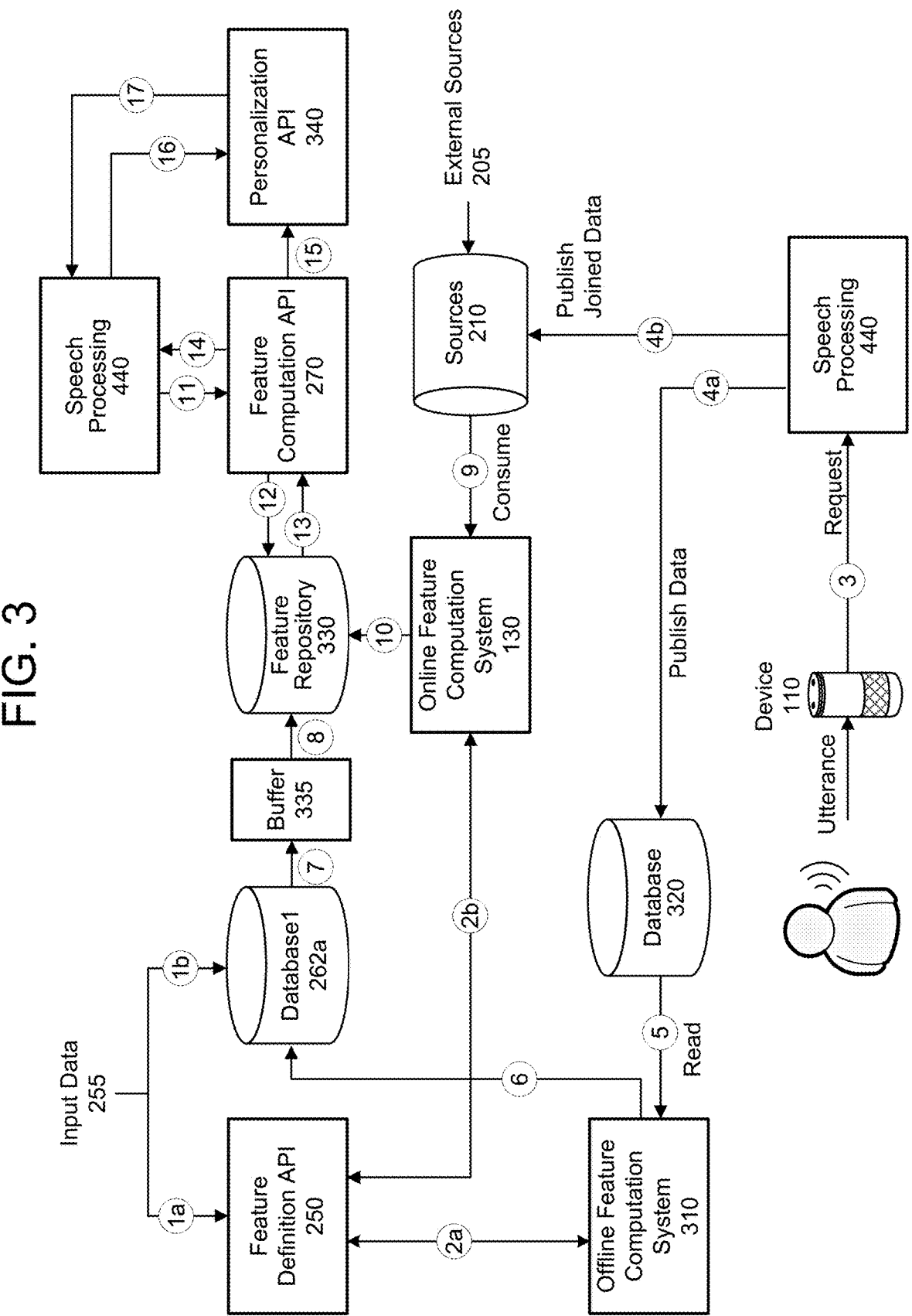
FIG. 3 illustrates an example component diagram of a speech processing system configured to perform feature computation according to embodiments of the present disclosure.

FIG. 3 illustrates an example component diagram of a speech processing system configured to perform feature computation according to embodiments of the present disclosure. As illustrated in FIG. 3, the system 100 may include multiple components that are configured to perform feature computation. For example, FIG. 3 illustrates the online feature computation system 130 described above with regard to FIG. 1 and the feature computation API 270 described above with regard to FIG. 2, along with offline feature computation system 310.

The offline feature computation system 310 may include the components of and perform feature computation similar to the online feature computation system 130, except that the offline feature computation system 310 performs feature computation using batch processing (e.g., large batches of event data), whereas the online feature computation system 130 performs feature computation using continuous processing (e.g., near-real-time feature computation on event data as it is received).

As illustrated in FIG. 3, the system 100 may receive input data 255 that is input to the feature definition API 250 ("1a") and/or the first database (Database1) 262a ("1b"). For example, the input data 255 may correspond to programming or other input designed to improve feature computation performed by the system 100. The feature definition API 250 may send data to the offline feature computation system 310 ("2a") and/or the online feature computation system 130 ("2b") to control how feature computation is performed. For example, the offline feature computation system 310 and/or the online feature computation system 130 may request feature definition data (e.g., configuration data corresponding to the timeline, a list of features to compute for a particular event or type of event, feature definitions, and/or the like) and the feature definition API 250 may send the feature definition data to the offline feature computation system 310 and/or the online feature computation system 130.

In some examples, the speech processing components 440 (and/or other components such as Orchestrator 430, skill 490/125, external sources 205, or others) may receive a request corresponding to an utterance ("3") and may send event data to the offline feature computation system 310 ("4a") and/or the online feature computation system 130 ("4b") for processing. The online feature computation system 130 and the offline feature computation system 310 may perform feature computation using the techniques described above with regard to FIG. 1.

For example, FIG. 3 illustrates that the speech processing components 440 (or other component) may receive a request ("3") and send first event data ("4b") that is specific to a user profile to sources 210 (e.g., publish joined data). The sources 210 may receive additional event data from external sources 205 and may send the event data ("9") to the online feature computation system 130 for processing. Thus, the online feature computation system 130 may consume the event data, generate feature data, and send the feature data ("10") to the feature repository 330.

Similarly, the speech processing components 440 (or other component) may send second event data ("4a") (e.g., general event data that is not specific to a user profile or account) to a database 320 and the offline feature computation system 310 may receive the event data from the database 320 ("5") and generate feature response data. The offline feature computation system 310 may send the feature response data to the feature repository 330 via the first database (Database1) 262a ("7") and a buffer component 335 ("8"). For example, the offline feature computation system 310 may generate a large amount of feature response data so the buffer component 335 may temporarily store the feature response data and assist the feature repository 330 in writing or indexing the feature response data to long term storage within the feature repository 330. Thus, the feature repository 330 may receive feature data generated by the feature computation API 270, the online feature computation system 130, and/or the offline feature computation system 310 without departing from the disclosure.

Both the online feature computation system 130 and the offline feature computation system 310 are configured in a push model, such that the system 100 generates the feature response data and pushes the feature response data to downstream components (e.g., databases, such as feature repository 330) for later processing. In contrast, the feature computation API 270 is configured in a pull model, such that the system 100 generates and/or retrieves feature response data in response to a request from a downstream component. For example, the client API 275 may send a request to the feature computation API 270 and the feature computation API 270 may generate the feature response data in response to the request, as described above with regard to FIG. 2.

As illustrated in FIG. 3, the speech processing components 440 may send a request (e.g., query) to the feature computation API 270 ("11") and the feature computation API 270 may send the request to the feature repository 330 ("12"). In response, the feature repository 330 may send the feature response data indicated by the request to the feature computation API 270 ("13"). The feature computation API 270 may then send the feature response data to the speech processing components ("14") and/or a personalization API 340 ("15"). Additionally or alternatively, in some examples the feature computation API 270 may generate feature response data in response to a request received from other components such as Orchestrator 430, skill 490/125, external sources 205, or others (not shown) without departing from the disclosure.

The personalization API 340 may be configured to store user history data, user preferences, and/or the like associated with a user profile to improve a user experience. Thus, the speech processing components 440 may send a request ("16") to the personalization API 340 and the personalization API 340 may send context data ("17"), which may include the feature response data, to the speech processing components 440.

As described above, the speech processing components 440 may query the feature repository 330 via the feature computation API 270. This query corresponds to a read operation in which the speech processing components 440 requests historical data, without the system 100 performing additional feature computation processing and/or generating feature response data. For example, the feature computation API 270 may receive a query indicating a first time window of interest, may determine a second time window of interest that includes the first time window of interest (e.g., expands a time range associated with the request), may fetch aggregation data corresponding to the second time window of interest, and may determine an aggregation value and/or feature response data corresponding to the first time window of interest. The feature computation API 270 may send the aggregation value/feature response data to the speech processing components 440 without storing the aggregation value/feature response data in the feature repository 330. However, the disclosure is not limited thereto, and the feature computation API 270 may input the feature response data to the feature repository 330 without departing from the disclosure.

As will be described in greater detail below with regard to FIG. 6B, the feature computation API 270 may determine a specific aggregation value corresponding to a specific time window of interest using the aggregation data retrieved from the feature repository 330 in response to the query. For example, the aggregation data may include aggregation values corresponding to multiple time ranges, such as first aggregation values corresponding to 15 minute blocks, second aggregation values corresponding to 1 hour blocks, and so on. Thus, the feature computation API 270 may add and/or subtract the aggregation values to generate the specific aggregation value corresponding to the first time window of interest.

To illustrate a first example, the specific time window of interest may correspond to an hour and a half. To determine a corresponding aggregation value, the feature computation API 270 may either retrieve six values from the first aggregation values (e.g., six 15-minute blocks) and sum them, or the feature computation API 270 may retrieve a single value from the second aggregation values (e.g., one 1-hour block) and two values from the first aggregation values (e.g., two 15-minute blocks) and sum them. Similarly, if the specific time window of interest corresponds to an hour and forty-five minutes (1 h 45 m), the feature computation API 270 may either retrieve seven values from the first aggregation values (e.g., seven 15-minute blocks) and sum them, or the feature computation API 270 may retrieve two values from the second aggregation values (e.g., two 1-hour blocks) and one value from the first aggregation values (e.g., one 15-minute block) and subtract the one 15-minute block from the two 1-hour blocks. Thus, the feature computation API 270 may use the first aggregation values, the second aggregation values, and/or additional aggregation values to identify a specific time window of interest and determine a corresponding aggregation value using various techniques without departing from the disclosure.

While the above description illustrates simple examples including the first aggregation values and the second aggregation values, the disclosure is not limited thereto and the system 100 may use additional higher order aggregation data to determine the specific aggregation value without departing from the disclosure. Thus, the system 100 may retrieve multiple types of aggregation data (e.g., aggregation data having different time windows or granularity) in response to a single query, enabling the system 100 to generate aggregation data using flexible parameters. As will be described in greater detail below with regard to FIG. 7B, the system 100 may store the aggregation data for multiple time windows as a single row of data (e.g., co-locate the aggregation data), enabling the system 100 to retrieve the multiple types of aggregation data using a single query.

The system 100 may operate using various components as described in FIG. 4. As shown in FIG. 4 a system 100 configured to process natural language inputs (for example by receiving user inputs in the form of audio, text, or other forms, interpreting the inputs and causing commands responsive to the inputs to be executed) may include various components such as device(s) 110, remote system 120, skill server(s) 125, or other components. The various components may be located on a same or different physical devices. Communication between various components may occur directly or across a network(s) 199.

Although FIG. 4 illustrates a first device 110*a* as a speech-controlled device, many other devices may be used without departing from the disclosure, such as a smartphone, television, computer, appliance, or other device depending on system configuration. Additionally or alternatively, the user 5 may provide input data other than audio data without departing from the disclosure. As used herein, the overall system 100 and/or the remote system 120 may be a system configured to process natural language inputs.

The first device 110*a* may include a microphone array and one or more loudspeaker(s) 114 and may communicate with the remote system 120 using one or more network(s) 199. In some examples, the first device 110*a* may detect input audio 11 corresponding to a spoken utterance originating from a user 5. The first device 110*a*, using a wakeword detection component 420, may generate and process input audio data 111 corresponding to the input audio 11 to determine that the input audio data 111 includes a representation of a keyword (e.g., wakeword). Following detection of a wakeword, the first device 110*a* may send the input audio data 111, corresponding to the utterance, to the remote system 120 for processing.

In some examples, the remote system 120 may be configured to enable voice commands (e.g., identify a spoken command included in the audio data). For example, the remote system 120 may receive the input audio data 111 from the first device 110*a* and may process the input audio data 111, for example using speech processing such as automatic speech recognition (ASR) processing, natural language understanding (NLU) processing, and/or the like, to determine that the input audio data 111 represents a voice command. The remote system 120 may determine an action corresponding to the voice command and may perform the action, send a request to the first device 110*a* to perform the action, and/or send a request to a remote device (not shown) to perform the action.

Alternatively, a second device 110*b* may receive input from the user 5 corresponding to text or a button press via a touch screen providing a virtual keyboard. The second device 110*b* may generate input text data 413 corresponding to the input text. The second device 110*b* may send the input text data 413 to the remote system 120 via an application operating on the second device 110*b* and in communication with the remote system 120.

Upon receipt by the remote system 120, the input audio data 111 and/or the input text data 413 may be sent to an orchestrator component 430. The orchestrator component 430 may include memory and logic that enables the orchestrator component 430 to transmit various pieces and forms of data to various components of the system.

The orchestrator component 430 sends the input audio data 111 to a speech processing component 440. In some examples, the speech processing component 440 may include an ASR component 445 and an NLU component 450 that are configured to process the input audio data 111 to generate NLU data. However, the disclosure is not limited thereto and in other examples, the speech processing component 440 may include a spoken language understanding (SLU) component 455 that is configured to process the input audio data 111 to generate the NLU data, as will be described in greater detail below with regard to FIGS. 5A-6B. Additionally or alternatively, the speech processing component 440 may include the ASR component 445, the NLU component 450 and/or the SLU component 455 without departing from the disclosure.

An ASR component 445 of the speech processing component 440 transcribes the input audio data 111 into input text data representing one more hypotheses representing speech contained in the input audio data 111. The ASR component 445 interprets the utterance in the input audio data 111 based on a similarity between the utterance and pre-established language models. For example, the ASR component 445 may compare the input audio data 111 with models for sounds (e.g., subword units, such as phonemes, etc.) and sequences of sounds to identify words that match the sequence of sounds spoken in the utterance represented in the input audio data 111. The ASR component 445 sends (either directly or via the orchestrator component 430) the input text data generated thereby to an NLU component 450 of the speech processing component 440. The input text data output by the ASR component 445 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The orchestrator 430 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a quiz game skill, where multiple questions are asked of the user and the user responds with utterances that are processed by the system and whose text data is sent to the quiz show skill. Each utterance of the dialog may have a unique utterance ID but may also share a common dialog ID so that the system can process incoming audio data knowing that it is associated with a particular dialog.

Alternatively, a device (such as a mobile device) may send input text data to the remote system 120. Upon receipt by the remote system 120, the input text data may be sent to the orchestrator component 430. The orchestrator component 430 may send the input text data to the NLU component 450 for processing as if the input text data came from the ASR component 445.

The NLU component 450 attempts to make a semantic interpretation of the phrases or statements represented in the input text data input therein. That is, the NLU component 450 (as described in detail herein) determines one or more meanings associated with the phrases or statements represented in the input text data based on individual words represented in the input text data. The NLU component 450 determines an intent (e.g., an action that a user desires be performed) of a command represented in the input text data as well as pertinent pieces of information in the input text data that allow a device (e.g., the device 110, the remote system 120, the skill server(s) 125, etc.) to execute the intent. For example, if the input text data corresponds to "call mom," the NLU component 450 may determine that the user 5 intended to initiate a call with a contact matching the entity "mom."

The remote system 120 may include an online feature computation system 130, which may receive event data from other components and generate features corresponding to the event data. The online feature computation system 130 is described in greater detail above with regard to FIG. 1.

The remote system 120 may include an aggregator component 485 that receives NLU results data and determines (as described in detail herein) which skill(s) 490 and/or skill server(s) 125 to the system should call to execute an input command. The aggregator component 485 may be implemented separately from the orchestrator component 430 (as illustrated) or one or more components of the aggregator component 485 may be implemented as part of the orchestrator component 430.

When audio data of an utterance is received, ASR is performed to determine text corresponding to the audio data and NLU is performed to determine what intent/action is intended by the utterance. Depending on the NLU output data, an instruction is sent to a skill component for handling the action called for in the utterance.

A "skill" component may include software running on the remote system 120, the skill server(s) 125, and/or a remote device (not illustrated) that is akin to an application. That is, a skill 490 may enable the remote system 120 to execute specific functionality in order to provide data or produce some other output requested by a user. The remote system 120 may be configured with more than one skill 490. For example, a weather service skill may enable the remote system 120 to provide weather information, a car service skill may enable the remote system 120 to book a trip with respect to a taxi or ride sharing service, an order pizza skill may enable the remote system 120 to order a pizza with respect to a restaurant's online ordering system, etc. A skill component may include hardware, software, firmware, or the like that may be dedicated to the particular skill or shared among different components. The skill component may be part of the remote system 120 (for example as skill 490) or may be located at whole (or in part) with separate skill server(s) 125. Skill server(s) 125 may communicate with skills 490 within the remote system 120 and/or directly with the orchestrator 430 or with other components. For present purposes, unless expressly stated otherwise, reference to a skill or skill component (such as skill 490) may include a skill component operating within remote system 120 and/or skill operating within skill server(s) 125.

A skill 490 may be configured to perform one or more actions. That is, a skill component may execute specific functionality in order to provide data or produce some other output requested by a user. A particular skill component may be configured to execute more than one action. For example, a weather service skill involve a skill component providing weather information to the remote system 120, a car service skill may involve a skill component booking a trip with respect to a taxi or ride sharing service, an order pizza skill may involve a skill component ordering a pizza with respect to a restaurant's online ordering system, etc.

A skill(s) 490 and may be in communication with one or more skill servers 125 implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

In some instances, a skill(s) 490 or a skill server(s) 125 may provide output text data responsive to the present user command. The remote system 120 may include a text-to-speech (TTS) component 480 that generates output audio data from skill(s) 490 and skill server(s) 125 provided output text data. The TTS component 480 may use different synthesis techniques. In one method of synthesis called unit selection, the TTS component 480 matches text data against a database of recorded speech. The TTS component 480 selects units of recorded speech matching the text data and concatenates the units together to form output audio data. In another method of synthesis called parametric synthesis, the TTS component 480 varies parameters such as frequency, volume, and noise to create output audio data including an artificial speech waveform. Parametric synthesis uses a computerized voice generator, sometimes called a vocoder.

The remote system 120 may include a user recognition component 295. The user recognition component 295 may take as input the input audio data 111 and/or input text data output by the ASR component 445 as well as potential other input data such as video, biometric data, or the like. The user recognition component 295 determines scores indicating whether the command originated from a particular user. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing audio characteristics in the input audio data 111 to stored audio characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform NLU processing as well as processing performed by skills 490 and/or skill servers 125, routing by an action manager, or other functions.

The remote system 120 may include a user profile storage 470. The user profile storage 470 may include a variety of information related to individual users, groups of users, etc. that interact with the system. The user profile storage 470 may include one or more accounts (e.g., customer profiles). Each account may be associated with a different customer identification (ID). An account may be an umbrella profile specific to a group of users. That is, a single account may encompass two or more individual user profiles, each associated with a respective user ID. For example, an account may be a household account that encompasses user profiles associated with multiple users of a single household. An account may include preferences shared by all the user profiles encompassed thereby. Each user profile encompassed under a single account may include preference data specific to the user associated therewith. That is, each user profile may include preference data unique from one or more other user profiles encompassed by the same account. The preference data may include information indicating what preferences the user has with regard to certain skills or other information. A user profile may be a stand-alone profile or may be encompassed under the account. A user profile may also include history data which may be data representative of previous interactions between the user of the user profile and the system. A user profile may incorporate information associating one device with another. For example, if a user has one speech-capture device (such as an Echo Dot) in the same room as a media playback device (such as a Fire TV), the user may indicate the two devices should be linked, thus allowing the system to more easily recognize spoken media playback commands received by the Echo Dot may be intended to cause media to playback on the Fire TV. Thus the system may store an association between the devices as part of the user's (or other) profile. This may result in the system linking multiple devices as one "virtual device" where the system may treat the linked devices as a single device for certain purposes. For example, multiple loudspeakers may be linked as a single audio output device for purposes of playing music through multiple speakers simultaneously (e.g., as part of a surround sound system). As another example, an Echo Dot and Fire TV may be linked for purposes of capturing audio commands that request video playback. As illustrated, the user profile storage 470 is implemented as part of the remote system 120. However, it should be appreciated that the user profile storage 470 may be located proximate to the remote system 120, or may otherwise be in communication with the remote system 120, for example over the network(s) 199. User profile data may be used to inform NLU processing as well as processing performed by skills 490.

In some examples, the system 100 may use the features and/or feature response data to improve automatic speech recognition (ASR) processing, natural language understanding (NLU) processing, and/or machine learning corresponding to processing NLU data. For example, the system 100 may improve ASR processing by training an ASR hypothesis reranker component (e.g., improve how the ASR reranker component ranks and/or selects between potential ASR output data), may improve NLU processing by training an NLU reranker component (e.g., improve how the NLU reranker component ranks and/or selects between potential NLU output data), may improve machine learning processing by training a machine learning component (e.g., a rule-based machine learning component and/or a model-based machine learning component), and/or the like without departing from the disclosure.

FIG. 5 illustrates examples of timers and corresponding windows according to embodiments of the present disclosure. In order to generate the features, the system 100 may use specific windows to aggregate events within different time ranges. In this context, the window specifies which events will be aggregated to generate individual features. Examples of windows may include tumbling windows (e.g., fixed windows), sliding windows, session windows, and/or the like, although the disclosure is not limited thereto and the system 100 may use any window known to one of skill in the art.

A tumbling window may correspond to a specific length of time (e.g., 15 minutes, 1 hour, 1 day, 1 week, etc.) and a global time. Thus, tumbling windows are a series of fixed-sized, non-overlapping and contiguous time intervals. For example, the system 100 may aggregate events every 15 minutes, such that a particular hour is comprised of four windows corresponding to "00," "15," "30," and "45." Additionally or alternatively, the system 100 may aggregate events every hour, such that a day is comprised of 24 windows ranging from "1 AM" (e.g., 0100) to "12 AM" (e.g., 2400). However, the disclosure is not limited thereto and the specific length of time may vary without departing from the disclosure.

To conceptually illustrate examples of tumbling windows 510, FIG. 5 illustrates separating a timeline of events into 1 hour windows 512 (e.g., 10 AM-11 AM, 11 AM-12 PM, 12 PM-1 PM, etc.) and 15 minute windows 514 (e.g., "00," "15," "30," "45" for each hour). However, the disclosure is not limited thereto and the system 100 may use any number of tumbling windows corresponding to any length of time without departing from the disclosure.

A sliding window may correspond to a specific length of time (e.g., 15 minutes, 1 hour, 1 day, 1 week, etc.) relative to a current time. For example, the system 100 may aggregate events occurring within the last 15 minutes, within the last hour, within the last day, etc. Thus, the sliding window is not fixed based on a global time (e.g., system clock), but is relative to a current time and/or current event being processed. To conceptually illustrate examples of sliding windows 520, FIG. 5 illustrates aggregating first events occurring within a 1 hour window 522 (e.g., 3 events) and aggregating second events occurring within a 15 minute window 524 (e.g., 1 event), although the disclosure is not limited thereto.

A session window may correspond to a series of events that occur in proximity to each other (e.g., within a specific period of time). For example, a session window may correspond to a cluster of events and/or events that have occurred during an ongoing interaction between the user 5 and the system 100. In some examples, a session window may be defined as including events that have occurred in the past 15 minutes up to a maximum number of events (e.g., maximum of 20 events, although the disclosure is not limited thereto). In other examples, a session window may be defined as including a series of events that are within a specified duration of a neighboring event (e.g., up to one minute apart) and up to a maximum number of events (e.g., maximum of 7 events, although the disclosure is not limited thereto). Thus, a first event and a second event that occur within a minute of each other may be grouped in a first session window, whereas a third event that occurs three minutes after the second event may be separated into a second session window. However, the disclosure is not limited thereto and the system 100 may define a session window using any techniques known to one of skill in the art without departing from the disclosure.

To conceptually illustrate examples of session windows 530, FIG. 5 illustrates separating the timeline of events into four separate session windows 530A-530D. For example, a first session window 530A includes two events, a second session window 530B includes two events, a third session window 530C includes one event, and a fourth session window 530D includes three events.

The system 100 cannot generate features and aggregate events within a window until the window ends. For example, the system 100 cannot generate features for a tumbling window until a particular time (e.g., "00," "15," "30," and "45" for 15 minute tumbling windows). Similarly, the system 100 cannot generate features and aggregate events for a session window until the maximum number of events is reached and/or the duration of time has elapsed (e.g., 1 minute between events) without receiving another event. When the window ends, the system 100 "closes" the window by generating features for the window. For example, the system 100 may detect when a window ends and may close the window by performing feature computation for events included within the window. The system 100 may store the features within the timeline. In some examples, the system 100 may remove the events from the timeline upon performing feature computation, although the disclosure is not limited thereto and the system 100 may store the events in a separate timeline from the features and/or may store the events and corresponding features within a single timeline without departing from the disclosure.

To determine when a window ends, the system 100 may set an alarm using a timer, such that the alarm signals to the system 100 to close the window. In some examples, the system 100 may set alarms at specific times to close tumbling windows. Thus, the system 100 may set one or more timers based on the number of tumbling windows, with a first timer (e.g., 15 minute timer) being reset each time the system 100 closes a 15 minute tumbling window, a second timer (e.g., 1 hour timer) being reset each time the system 100 closes a 1 hour tumbling window, and so on. Additionally or alternatively, the system 100 may close sliding windows and/or session windows by setting a timer upon receiving an event. For example, the system 100 may receive a first event and set a third timer (e.g., 1 minute timer). If the system 100 receives a second event before the third timer expires (e.g., within one minute of the first event), the system 100 may reset the third timer and continue (e.g., leaving the session window open). However, if the system 100 does not receive the third event before the third timer expires (e.g., if the third event occurs three minutes after the second event), the system 100 may detect that the third timer expired and close the session window.

In some examples, the event consumer component 220 may be configured to determine when to close windows and/or to close the windows for the system 100. However, the disclosure is not limited thereto, and in other examples the dispatcher component 240 may be configured to determine when to close the windows and/or to close the windows without departing from the disclosure. Additionally or alternatively, there may be a separate component called a window evaluator component (not illustrated) that is configured to determine when to close the windows and/or to close the windows without departing from the disclosure. For example, the window evaluator component may receive information indicating relevant windows and/or parameters associated with the windows from the feature definition API 250. In some examples, the window evaluator may include one or more timers, with each individual timer associated with a specific window. Thus, the window evaluator component may use the information received from the feature definition API 250 to set and control the timers to open a new window and/or determine when to close an open window without departing from the disclosure.

As discussed above, the system 100 may use one or more features to interpret a subsequent voice command. For example, the system 100 may receive a voice command requesting a song title by a particular artist and may determine, based on the features, that the user profile has requested the song title by the particular artist multiple times within a recent time period. In order to identify relevant features, the system 100 may make a query (e.g., query the timeline) by sending a query to a relevant database and receiving query results indicating the requested features.

Figure 6A:
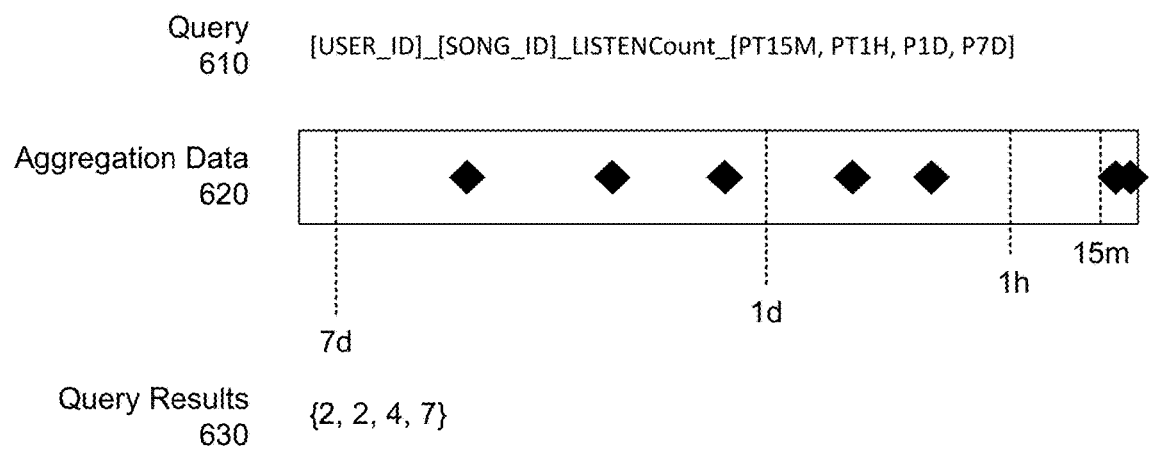
FIGS. 6A-6B illustrate examples of query results according to embodiments of the present disclosure.
Figure 6B:
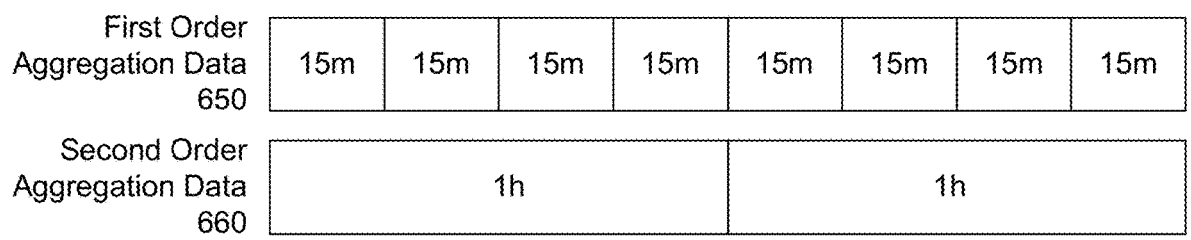

FIGS. 6A-6B illustrate examples of query results according to embodiments of the present disclosure. As discussed above, the system 100 may track a number of times that a user profile has listened to a particular song over a variety of different time ranges (e.g., 15 minutes, 1 hour, 1 day, 7 days, etc.). The aggregate number of times that the song has been requested during each time range may correspond to individual features associated with an "event," which in this case would be the request to listen to the particular song. As illustrated in FIG. 6A, upon receiving the request to listen to the particular song, the system 100 may send a query 610 (e.g., "[USER_ID]_[SONG_ID]_LISTENCount_{PT15M, PT1H, P1D, P7D}") to a relevant database.

The database may store aggregation data 620 corresponding to the features extracted by a feature computation engine. While the aggregation data 620 may be stored in various formats without departing from the disclosure, for ease of illustration FIG. 6A illustrates a visual representation of the aggregation data 620. For example, the aggregation data 620 is visually represented as a series of events that are separated into four windows relative to a current time (e.g., far right of the timeline). Thus, viewed right-to-left, a 15 minute window is indicated by a first dotted line and includes two events, a 1 hour window is indicated by a second dotted line and includes only the two events from the 15 minute window, a 1 day window is indicated by a third dotted line and includes two additional events (e.g., total of four events), and a 7 day window corresponds to a fourth dotted line and includes three additional events (e.g., total of seven events). Thus, in response to the query 610, the database may return query results 630 (e.g., {2, 2, 4, 7}), although this is intended to illustrate a single example and the disclosure is not limited thereto.

While the example illustrated in FIG. 6A corresponds to tracking a number of times that a particular song has been requested, the disclosure is not limited thereto and the system 100 may track a number of times that the user profile requested to listen to any song, a particular genre, a particular artist, a particular album, and/or the like without departing from the disclosure. Additionally or alternatively, the system 100 may track any type of event, including commands to control voice-enabled devices, perform one or more actions, and/or other interactions with the remote system 120 known to one of skill in the art.

In some examples, the system 100 may store features as first order aggregation data 650, second order aggregation data 660, and/or the like. For example, as tumbling windows are contiguous and do not overlap, the system 100 may combine features from multiple tumbling windows without double-counting any individual events. As illustrated in FIG. 6B, the system 100 may first calculate first order aggregation data 650 using first tumbling windows that correspond to a first period of time (e.g., 15 minutes). Using the first order aggregation data 650, the system 100 may then calculate second order aggregation data 660 using multiple first tumbling windows that combine to form a second tumbling window that corresponds to a second period of time (e.g., 1 hour). For example, the system 100 may calculate the second order aggregation data 660 using four of the first tumbling windows for each hour.

As illustrated in FIG. 6B, the first order aggregation data 650 may result in first order query results 652 (e.g., {"00"=1, "15"=3, "30"=6," "45"=2}). Thus, a single event was associated with the first tumbling window ("00"), three events were associated with the second tumbling window ("15"), six events were associated with the third tumbling window ("30"), and two events were associated with the fourth tumbling window ("45"). However, the second order aggregation data 660 may result in higher order query results 662 (e.g., 12), indicating that twelve events were associated with a fifth tumbling window ("1 h").

To determine a specific aggregation value corresponding to a specific time window of interest, the system 100 may retrieve the first order aggregation data 650 and the second order aggregation data 660 and perform additional processing to determine the aggregation value. To illustrate a first example, the specific time window of interest may correspond to an hour and a half. To determine a corresponding aggregation value, the system 100 may either retrieve six values from the first order aggregation data 650 (e.g., six 15-minute blocks) and sum them, or the system 100 may retrieve a single value from the second order aggregation data 660 (e.g., one 1-hour block) and two values from the first order aggregation data 650 (e.g., two 15-minute blocks) and sum them. Similarly, if the specific time window of interest corresponds to an hour and forty-five minutes (1 h 45 m), the system 100 may either retrieve seven values from the first order aggregation data 650 (e.g., seven 15-minute blocks) and sum them, or the system 100 may retrieve two values from the second order aggregation data 660 (e.g., two 1-hour blocks) and one value from the first order aggregation data 650 (e.g., one 15-minute block) and subtract the one 15-minute block from the two 1-hour blocks. Thus, the system 100 may use the first order aggregation data 650 and the second order aggregation data 660 to identify a specific time window of interest and determine a corresponding aggregation value using various techniques without departing from the disclosure.

While the above description illustrates simple examples including the first order aggregation data 650 and the second order aggregation data 660, the disclosure is not limited thereto and the system 100 may use additional higher order aggregation data (not illustrated) to determine the aggregation values. Thus, the system 100 may retrieve multiple types of aggregation data (e.g., aggregation data having different time windows or granularity) in response to a single query, enabling the system 100 to generate aggregation data using flexible parameters.

While FIG. 6B illustrates the first order tumbling windows corresponding to a first period of time (e.g., 15 minutes), the disclosure is not limited thereto and in some examples the first order tumbling windows may correspond to the second period of time (e.g., 1 hour) or longer without departing from the disclosure. Additionally or alternatively, while FIG. 6B illustrates the system 100 determining second order aggregation data 660, the disclosure is not limited thereto and the system 100 may continue to calculate higher order aggregation data corresponding to larger periods of time (e.g., 1 day, 7 days, 30 days, etc.) without departing from the disclosure.

While FIGS. 6A-6B illustrate examples of determining features based on a total number of events, the disclosure is not limited thereto. Instead, the system 100 may determine features based on a sum of events (e.g., total number of events), an average, a standard deviation, a percentile, a top-k, and/or using any technique known to one of skill in the art without departing from the disclosure.

FIGS. 7A-7B illustrate examples of storing feature data and performing queries according to embodiments of the present disclosure. As illustrated in FIG. 7A, the system 100 may store feature data having different granularity (e.g., time ranges) as separate rows in a database and/or in separate databases. For example, FIG. 7A illustrates daily aggregate data 710, hourly aggregate data 720, and quarter hourly aggregate data 730 being stored separately from one another. For ease of explanation, this example refers to the feature data as aggregate data (e.g., aggregation data), which corresponds to a total amount of events. However, this is intended to illustrate a simple example and the disclosure is not limited thereto.

When the system 100 stores the feature data separately, the system 100 must send three queries to retrieve features from the database. For example, the system 100 may send a first query (Query1) 712 to retrieve first aggregation data (Aggregation1) 714 corresponding to the daily aggregate data 710, a second query (Query2) 722 to retrieve second aggregation data (Aggregation2) 724 corresponding to the hourly aggregate data 720, and a third query (Query3) 732 to retrieve third aggregation data (Aggregation3) 734 corresponding to the quarter hourly aggregate data 730. While the query can specify a desired time range such that the aggregation data retrieved provides the features requested by the system 100, this process requires sending multiple queries to the database.

FIG. 7B illustrates an improved method of storing feature data by co-locating the feature data despite differences in granularity. For example, FIG. 7B illustrates that the system 100 may store combined aggregate data 740 that includes feature data 752, which comprises the daily aggregate data 710, the hourly aggregate data 720, and the quarter hourly aggregate data 730, enabling the system 100 to retrieve a desired time range using a single query. Thus, the system 100 may send a fourth query (Query4) 742 to retrieve fourth aggregation data (Aggregation4) 744 corresponding to the combined aggregate data 740.

After receiving the fourth aggregation data (Aggregation4) 744, the system 100 may select one or more time ranges based on the desired granularity. For example, FIG. 7B illustrates multiple time ranges 750, including a daily time range 750*a*, an hourly time range 750*b*, and a quarter hourly time range 750*c*. Thus, the query to the database corresponds to a single request and retrieves a large portion of aggregate data, and then the system 100 may further process the portion of the aggregate data at different levels of granularity as relevant. This enables the system 100 to maintain a granular level while adding flexibility to the range query, instead of being limited to a predetermined time window.

Figure 8:
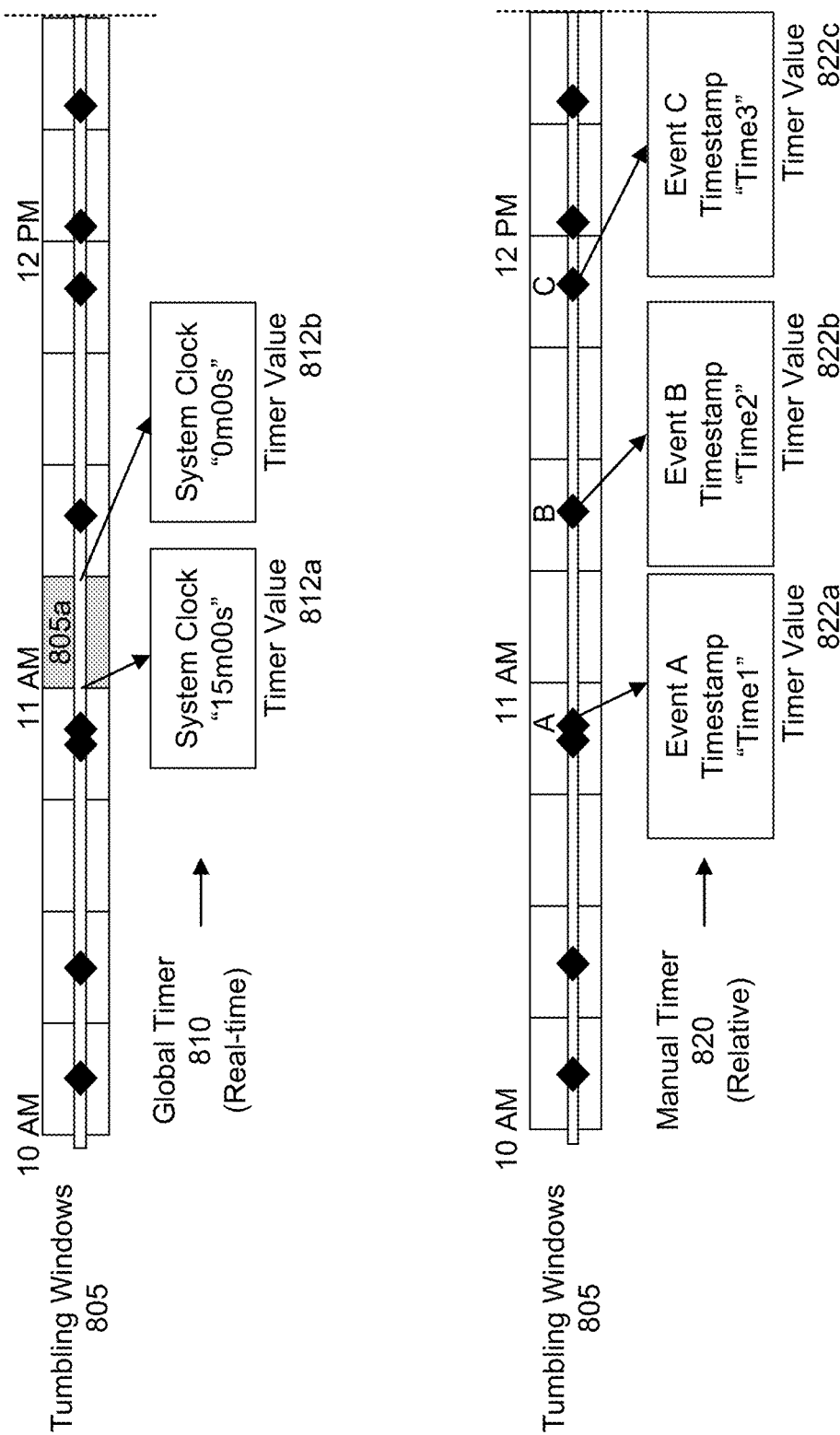
FIG. 8 illustrates examples of manually adjusting timers according to embodiments of the present disclosure.

FIG. 8 illustrates examples of manually adjusting timers according to embodiments of the present disclosure. As illustrated in FIG. 8, typically timers operate in real-time using a global timer such as a system clock. For example, if the timer is set to 15 minutes, the timer counts down using the system clock and triggers the system 100 to perform an action after 15 minutes have elapsed. FIG. 8 illustrates an example of this in which tumbling windows 805 corresponding to a first time period (e.g., 15 minutes) are closed based on a global timer 810 that operates in real-time. For example, FIG. 8 illustrates a particular tumbling window 805a highlighted in gray, which corresponds to the time range from 11:00 AM to 11:15 AM. At 11:00 AM, the system 100 may close the previous tumbling window and reset the global timer 810 to a value of fifteen minutes ("15 m00S"), as illustrated by first timer value 812a. Using the system clock, the system 100 may decrease the timer as time elapses until it expires ("0 m00 s") at 11:15 AM, as illustrated by second timer value 812b.

While using the global timer 810 and the system clock to trigger alarms works well during live processing (e.g., real-time processing or near-real-time processing), this technique is time consuming as it requires the full amount of time to elapse regardless of incoming events to process. Thus, 24 hours of a timeline takes 24 hours to process, even if there are only a few events included in that period of time. This results in inefficient processing when backfilling events that happened previously.

As used herein, live processing refers to real-time processing or near-real-time processing, such that input data is processed as the events occur. For example, the system 100 may consume events as they are received, generating features that may be used to interpret future voice commands. In contrast, backfilling or backfill processing refers to historical processing, such as processing previous events (e.g., events that occurred at a previous point in time). In some examples, the previous events were already processed and the system 100 may reprocess them to amend or correct the previous content (e.g., features) generated. Thus, the old content is replaced with the new content within the timeline, enabling the system 100 to correct mistakes or adapt to new input. However, the disclosure is not limited thereto, and in other examples the previous events were not processed but are being added to the timeline for the first time. For example, the system 100 may receive input data about a user profile from other input sources after the events have already occurred. While the system 100 did not process these events when they occurred, processing them later enables the system 100 to acquire more data and potentially improve an accuracy or user experience.

To avoid the inefficiencies associated with using a global timer 810, the system 100 may use a manual timer 820. For example, the system 100 may manually advance the timer as each event is processed. This makes the system 100 interrupt driven, requiring a new event to close windows, but is much more efficient. If events occur sporadically during a period of time, the system 100 may quickly process the events without waiting for the total time to elapse. Instead, the system 100 stores a timestamp with each event and manually advances the timer based on a difference between timestamps.

FIG. 8 illustrates the manual timer 820 as having a first timer value 822a (e.g., Event A Timestamp "Time1") for the first event A, a second timer value 822b (e.g., Event B Timestamp "Time2") for the second event B, and a third timer value 822c (e.g., Event C Timestamp "Time3") for the third event C. Thus, when the system processes Event B, the system 100 manually advances the manual timer 820 from the first timer value 822a (Time1) to the second timer value 822b (Time2) and determines whether to close any windows. For example, due to the delay between Time1 and Time2, the system 100 may close the tumbling window that ends at 11:00 AM, along with any session windows, generating features based on all events prior to Event B. Similarly, when the system processes Event C, the system 100 manually advances the manual timer 820 from the second timer value 822b (Time2) to the third timer value 822c (Time3) and determines whether to close any windows. Again, due to the delay between Time2 and Time3, the system 100 may close the tumbling window that ends at 11:30 AM, along with any session windows, generating features based on all events prior to Event C.

In some examples, the event consumer component 220 may include one or more timers and therefore may be configured to determine when to close windows and/or to close the windows for the system 100. However, the disclosure is not limited thereto, and in other examples the dispatcher component 240 may include the one or more timers and/or be configured to determine when to close the windows and/or to close the windows without departing from the disclosure. Additionally or alternatively, there may be a separate component called a window evaluator component (not illustrated) that includes the one or more timers and is therefore configured to determine when to close the windows and/or to close the windows without departing from the disclosure. For example, the window evaluator component may receive information indicating relevant windows and/or parameters associated with the windows from the feature definition API 250. In some examples, the window evaluator may include one or more timers, with each individual timer associated with a specific window. Thus, the window evaluator component may use the information received from the feature definition API 250 to set and control the timers to open a new window and/or determine when to close an open window without departing from the disclosure.

In some examples, each feature timeline (e.g., individual timeline within the overall timeline) may be associated with an individual timer within the window evaluator component. For example, the window evaluator component may process different portions of the timeline using multiple, independent timers such that the timers and/or feature computation do not conflict or negatively affect each other. Thus, the system 100 may include a plurality of timers that may advance separately, enabling the system 100 to process the timeline using multiple clock values simultaneously.

Figure 9:
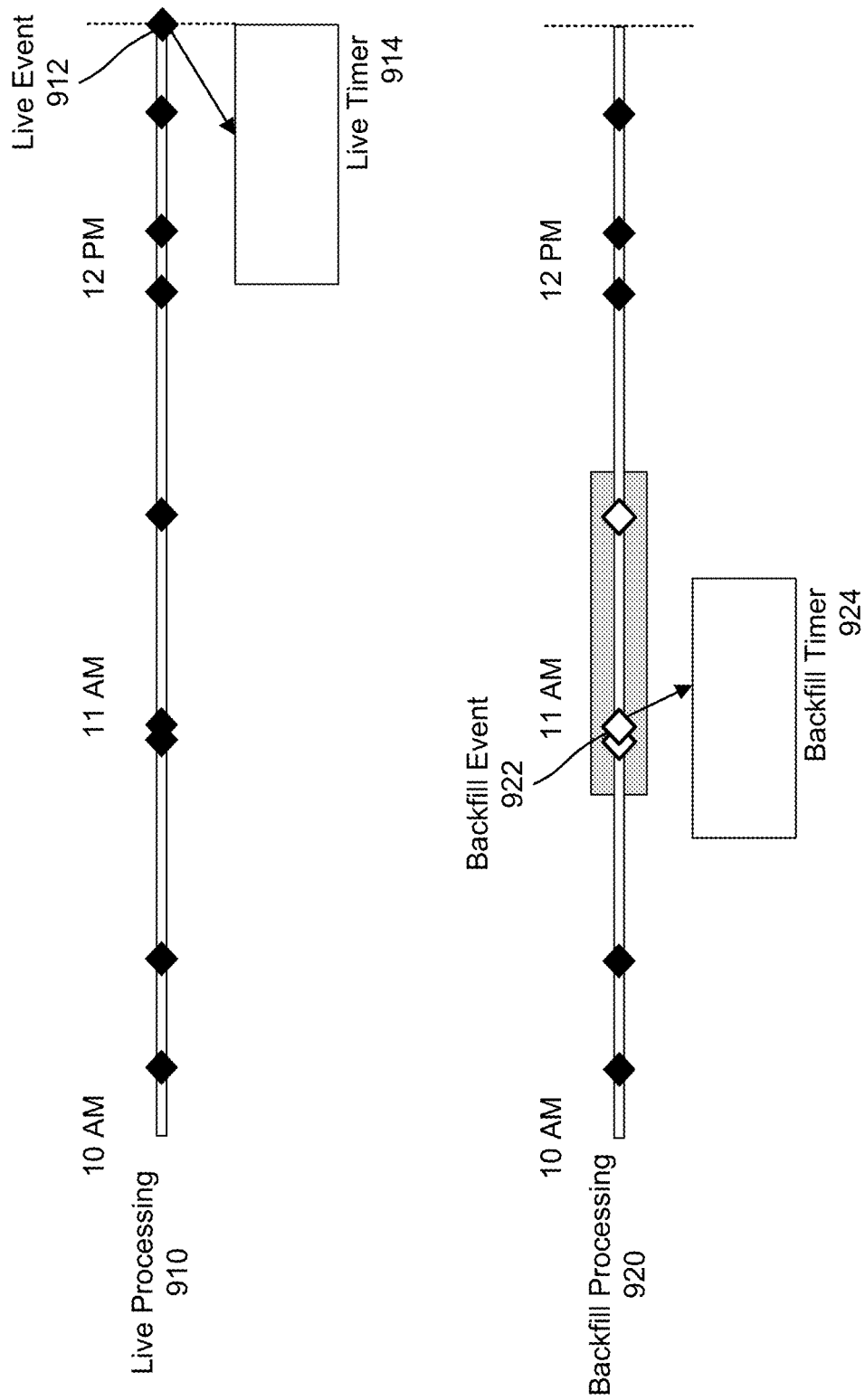
FIG. 9 illustrates an example of live and backfill events and timers according to embodiments of the present disclosure.

FIG. 9 illustrates an example of live and backfill events and timers according to embodiments of the present disclosure. To avoid issues with timers processing events nonlinearly (e.g., backfill processing), the system 100 may enable live timer(s) and backfill timer(s) and may label events as either "live events" or "backfill events." For example, FIG. 9 illustrates the system 100 performing live processing 910 and receiving a live event 912, which would be labeled as a live event. To process the live event 912, the system 100 may use a live timer 914 (or multiple live timers 914). In contrast, the system 100 may perform backfill processing 920 using one or more backfill timers.

As illustrated in FIG. 9, the system 100 may perform backfill processing 920 by receiving a backfill event 922, which may include a label indicating that it is a backfill event, and processing the backfill event 922 using a backfill timer 924. Thus, the system 100 may avoid issues with all events immediately being expired due to a timer not being configured for a backfill event. Using a combination of the live timer(s) and the backfill timer(s), the system 100 may process live events and previous events using the same timeline. Once the events are updated on the timeline, the distinction of the labels may no longer be necessary and therefore can be removed, although the disclosure is not limited thereto.

Figure 10:
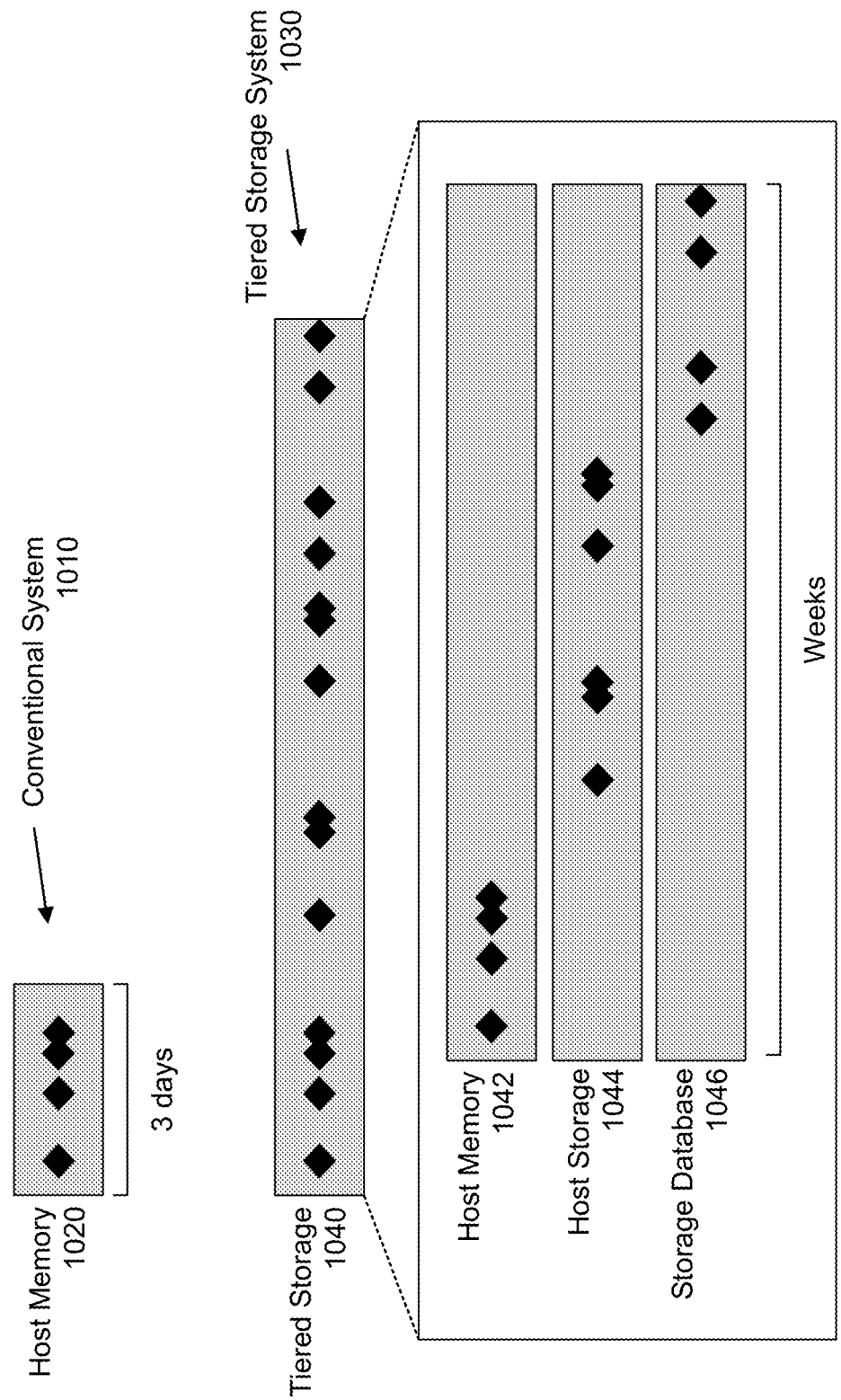
FIG. 10 illustrates an example of tiered timeline storage according to embodiments of the present disclosure.

FIG. 10 illustrates an example of tiered timeline storage according to embodiments of the present disclosure. As illustrated in FIG. 10, a conventional system 1010 may process a timeline of events using a fleet of hosts that store individual events in host memory 1020. Due to limitations caused by a finite amount of host memory 1020, the conventional system 1010 may only store a short period of time (e.g., 3 days). Thus, the conventional system 1010 is limited to short timelines and can only draw limited inferences between related events due to the short timeline.

To improve a length of the timeline (e.g., number of events used to perform feature computation), the system 100 may use a tiered storage system 1030 that comprises host memory 1042, host storage 1044 (e.g., hard drive(s)), and/or a storage database 1046. While these additional storage systems (e.g., host storage 1044 and/or storage database 1046) are slower than the host memory 1042, they allow the system 100 to process a larger number of events (e.g., longer timeline or stream of events) and compute correlations over days/weeks. The system 100 may implement the tiered storage system 1030 as a single timeline that takes into account all tiers and can respond to a query that spans across multiple tiers. For example, the system 100 may process tiered storage 1040, with recent events being stored in the host memory 1042, less recent events stored in the host storage 1044, and oldest events being stored in the storage database 1046.

Figure 11:
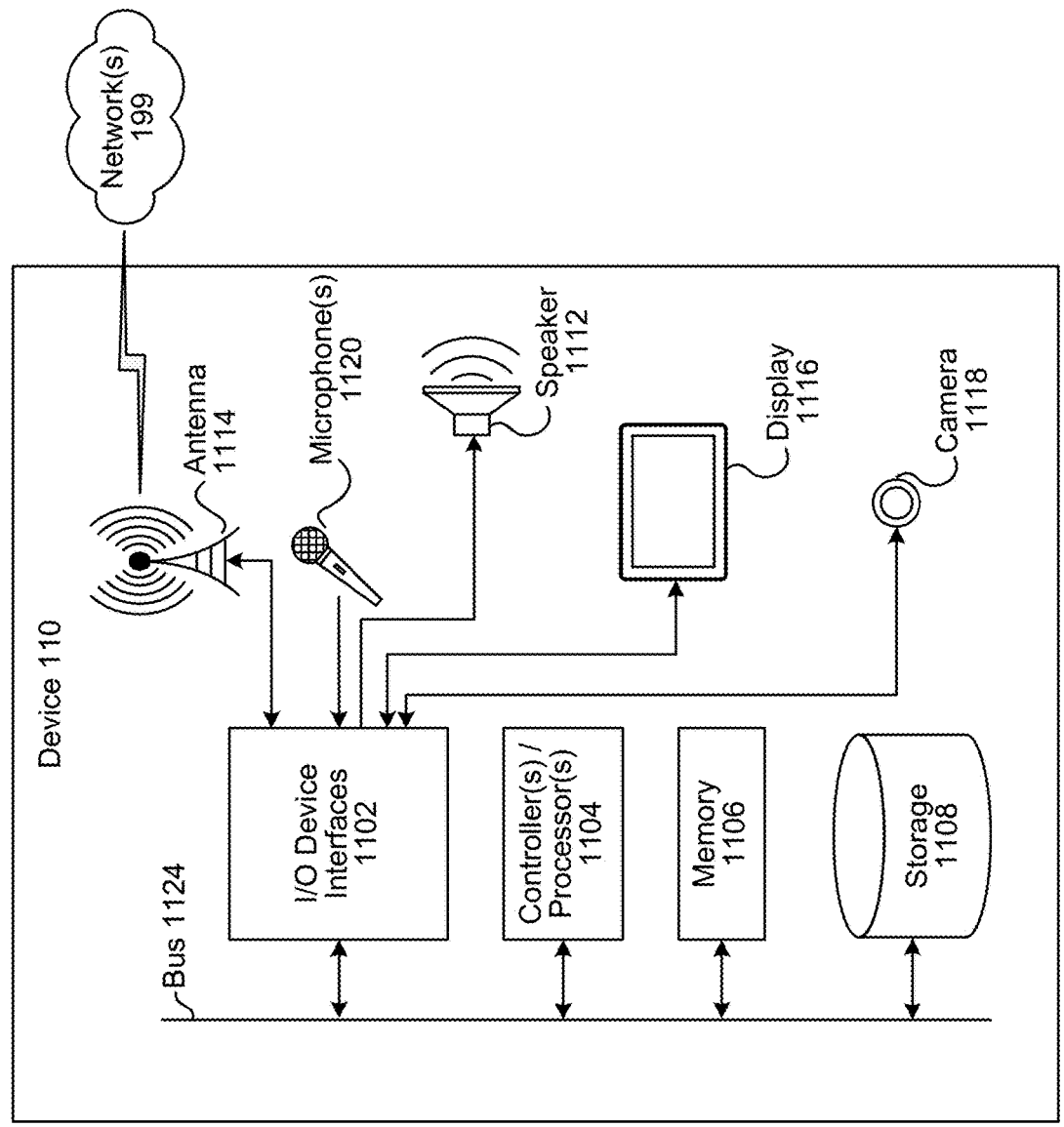
FIG. 11 is a block diagram conceptually illustrating example components of a device according to embodiments of the present disclosure.
Figure 12:
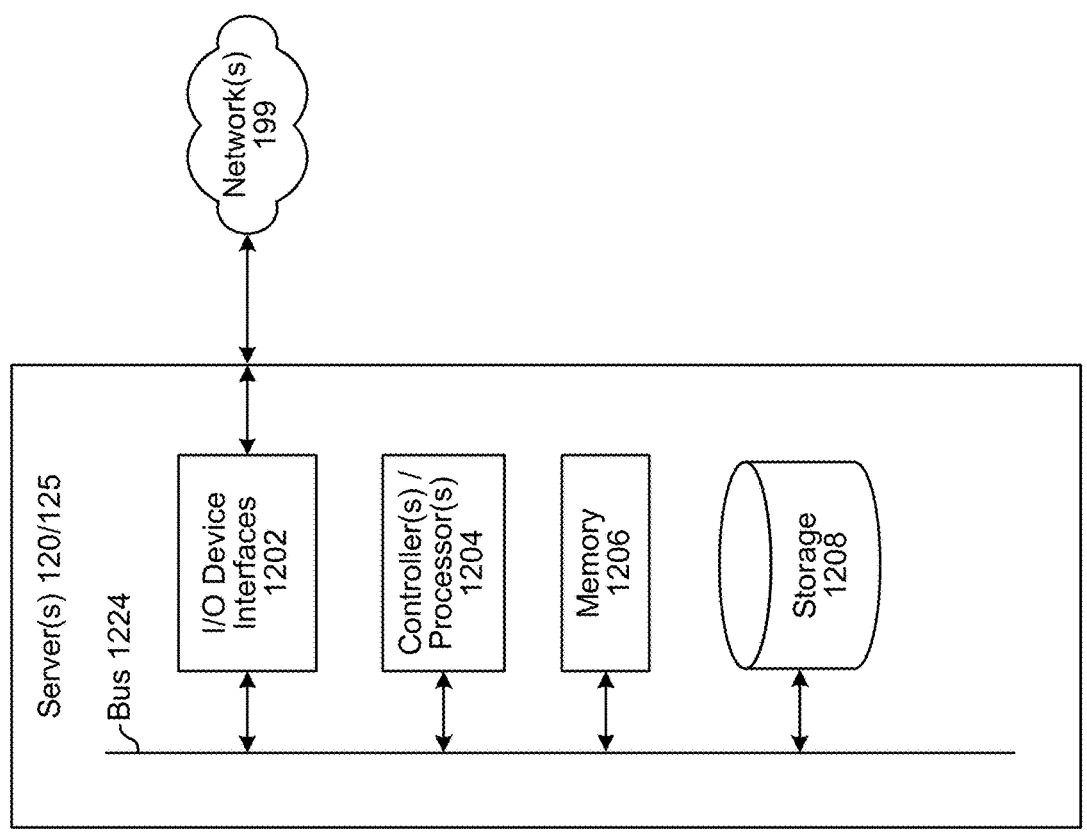
FIG. 12 is a block diagram conceptually illustrating example components of a system according to embodiments of the present disclosure.

FIG. 11 is a block diagram conceptually illustrating a device 110 that may be used with the system. FIG. 12 is a block diagram conceptually illustrating example components of the remote system 120, which may be one or more servers and which may assist with ASR processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the remote system 120, such as one or more servers for performing ASR processing, one or more servers for performing NLU processing, etc. In operation, each of these server (or groups of devices) may include computer-readable and computer-executable instructions that reside on the respective server, as will be discussed further below.

Each of these devices/systems (110/120) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1102/1202).

Computer instructions for operating each device/system (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device/system (110/120) includes input/output device interfaces (1102/1202). A variety of components may be connected through the input/output device interfaces (1102/1202), as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical systems in a collection of systems or other components.

The components of the device(s) 110 and/or the remote system 120 may include their own dedicated processors, memory, and/or storage. Alternatively, one or more of the components of the device(s) 110 and/or the remote system 120 may utilize the I/O interfaces (1102/1202), processor(s) (1104/1204), memory (1106/1206), and/or storage (1108/1208) of the device(s) 110 and/or the remote system 120, respectively. Thus, the ASR component 445 may have its own I/O interface(s), processor(s), memory, and/or storage; the NLU component 450 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and/or the remote system 120, as described herein, are illustrative, and may be located as a stand-alone device or may be included, in whole or in part, as a component of a larger device or system.

Figure 13:
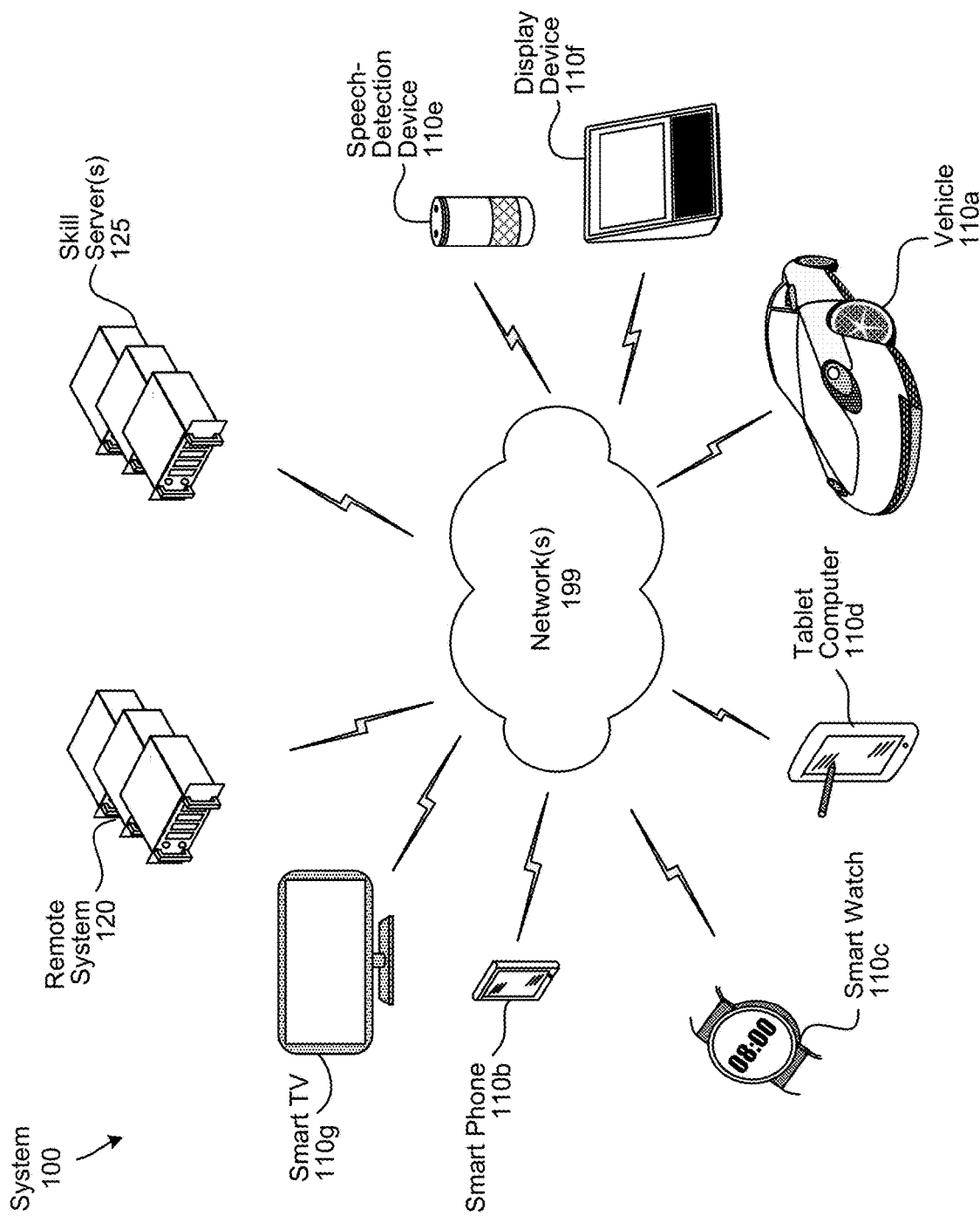
FIG. 13 illustrates an example of a network of devices according to embodiments of the present disclosure.

As illustrated in FIG. 13, multiple devices (110a-110g, 120, 125) may contain components of the system, and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a speech-detection device 110e, a display device 110f, and/or a smart television 110g may be connected to the network(s) 199 through a wireless service provider, over a WiFi or cellular network connection, or the like. Any of the devices 110 may be first devices or second devices depending on the system configuration. Other devices are included as network-connected support devices, such as the remote system 120, the media transport system 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 445, the NLU component 450, the SLU component 455, etc. of one or more systems 120.

The concepts disclosed herein may be applied within a number of different devices and computer systems, including, for example, general-purpose computing systems, speech processing systems, and distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving a first request to perform a first feature computation corresponding to natural language input events;
   sending, to a first component, a second request for feature definition data corresponding to the first feature computation;
   receiving, from the first component, the feature definition data, the feature definition data indicating that the first feature computation corresponds to aggregating a type of event within a first time window of interest;
   sending, to a second component, a third request for first aggregation data corresponding to the type of event and the first time window of interest, the second component configured to store a timeline for a user profile, the timeline comprising a plurality of aggregation data that includes the first aggregation data and represents a plurality of interactions involving the user profile and a system configured to process natural language inputs;
receiving, from the second component, the first aggregation data;
processing the first aggregation data using the first feature computation to generate first statistical values indicating a total number of times that the type of event occurred within the first time window of interest; and
sending the first statistical values to the second component to be stored in the timeline.

2. The computer-implemented method of claim 1, further comprising:
receiving, at a first time, first event data corresponding to a first interaction involving a user profile and a system configured to process natural language inputs, the first event data indicating the type of event;
sending, to the first component, a fourth request for configuration data corresponding to the type of event;
receiving, from the first component, the configuration data, wherein the configuration data indicates one or more types of information to extract from the first event data and that the first interaction corresponds to the timeline;
generating second event data using the first event data and the configuration data, the second event data corresponding to the first interaction, wherein the second event data represents the first time, the type of event, and a second time corresponding to the first interaction; and
associating the second event data with the timeline by storing the second event data in the second component.

3. The computer-implemented method of claim 1, further comprising:
receiving, by a system configured to process natural language inputs, audio data corresponding to an utterance;
performing speech processing on the audio data to determine that the audio data corresponds to the type of event;
identifying second statistical values that are associated with the timeline and the first feature computation, the second statistical values indicating the total number of times that the type of event occurred within a second time window of interest that is subsequent to the first time window of interest;
determining third statistical values using at least the first statistical values and the second statistical values;
using the third statistical values to determine intent data corresponding to the utterance; and
causing an action to be performed using the intent data.

4. The computer-implemented method of claim 1, further comprising, prior to receiving the first request:
receiving first event data corresponding to a first interaction involving a user profile and a system configured to process natural language inputs;
setting a timer to a first time at which the first interaction occurred;
processing the first event data to generate second event data;
receiving third event data corresponding to a second interaction involving the user profile and the system;
setting the timer to a second time at which the second interaction occurred;
determining a difference between the first time and the second time;
determining that the difference satisfies a condition, and in response to the difference satisfying the condition, generating the first request.

5. A computer-implemented method, the method comprising:
determining to perform a first feature computation corresponding to natural language input events;
sending, to a first component, a first request for parameters associated with the first feature computation;
receiving, from the first component, the parameters indicating that the first feature computation corresponds to aggregating a type of event within a first time window of interest;
sending, to a second component, a second request for first aggregation data corresponding to the type of event and the first time window of interest, the second component configured to store aggregation data corresponding to a timeline for a user profile, the timeline representing a plurality of interactions involving the user profile and a system configured to process natural language inputs;
receiving, from the second component, the first aggregation data;
processing the first aggregation data using the first feature computation to generate first feature data, the first feature data representing first statistical values corresponding to the first time window; and
associating the first feature data with the timeline.

6. The computer-implemented method of claim 5, further comprising:
receiving audio data corresponding to an utterance;
determining, using the timeline and the first feature data, second feature data corresponding to the first feature computation and a second time window that includes the first time window;
performing speech processing on the audio data to generate intent data corresponding to the utterance, wherein the speech processing uses the second feature data to generate the intent data; and
causing an action to be performed using the intent data.

7. The computer-implemented method of claim 5, further comprising, by the system:
receiving the first feature data; and
using the first feature data to train at least one of:
an automatic speech recognition hypothesis reranker component,
a natural language understanding reranker component,
a rule-based machine learning component, or
a model-based machine learning component.

8. The computer-implemented method of claim 5, further comprising:
receiving, at a first time, first event data corresponding to a first interaction involving the user profile and the system, the first event data indicating the type of event;
sending, to the first component, a third request for configuration data corresponding to the type of event;
receiving, from the first component, the configuration data, wherein the configuration data indicates one or more types of information to extract from the first event data and that the first interaction corresponds to the timeline;
generating second event data using the first event data and the configuration data, the second event data corresponding to the first interaction, wherein the second event data represents the first time, the type of event, and a second time corresponding to the first interaction; and
associating the second event data with the timeline by storing the second event data in the second component.

9. The computer-implemented method of claim 5, further comprising:
  generating, using the first feature computation, second feature data associated with a second time window subsequent to the first time window;
  storing the second feature data in the timeline;
  receiving, from the system, a request for third feature data associated with the first feature computation and a third time window;
  determining that the third time window comprises the first time window and at least the second time window;
  identifying, using the first feature computation and the first time window, the first feature data;
  identifying, using the first feature computation and the second time window, the second feature data;
  determining the third feature data using the first feature data and the second feature data; and
  sending the third feature data to the system.

10. The computer-implemented method of claim 5, wherein determining to perform the first feature computation further comprises:
  receiving first event data corresponding to a first interaction involving the user profile and the system;
  setting a timer to a first time associated with the first event data;
  processing the first event data to generate second event data;
  receiving third event data corresponding to a second interaction involving the user profile and the system, the second interaction occurring after the first interaction;
  setting the timer to a second time associated with the third event data;
  determining a difference between the first time and the second time;
  determining that the difference satisfies a condition; and
  in response to the difference satisfying the condition, determining to perform the first feature computation.

11. The computer-implemented method of claim 5, further comprising:
  receiving first event data corresponding to a first interaction involving the user profile and the system;
  processing the first event data to generate second event data;
  associating the second event data with the timeline and a first time;
  retrieving third event data from the timeline, the third event data associated with a second interaction involving the user profile and the system that occurred prior to the first interaction;
  setting a timer to a second time associated with the third event data;
  processing the third event data to generate fourth event data;
  associating the fourth event data with the timeline and the second time;
  retrieving the second event data from the timeline;
  determining the first time associated with the second event data;
  setting the timer to the first time;
  determining a difference between the second time and the first time;
  determining that the difference satisfies a condition;
  in response to the difference satisfying the condition, determining to perform the first feature computation;
  generating second feature data representing second statistical values corresponding to the first time window, the second feature data being different from the first feature data; and
  storing the second feature data in the timeline in place of the first feature data.

12. The computer-implemented method of claim 5, further comprising:
  receiving first event data corresponding to a first interaction involving the user profile and the system, the first event data indicating the type of event;
  sending, to the first component, a third request for configuration data corresponding to the type of event;
  receiving, from the first component, the configuration data;
  processing the first event data to generate second event data;
  using the configuration data to identify that the second event data is associated with the timeline;
  associating the second event data with the timeline by storing the second event data in a first storage device of the second component, the first storage device associated with a first amount of latency;
  determining that a period of time has elapsed; and
  storing the second event data in a second storage device of the second component, the second storage device associated with a second amount of latency that is larger than the first amount.

13. A system comprising:
  at least one processor; and
  memory including instructions operable to be executed by the at least one processor to cause the system to:
    determine to perform a first feature computation corresponding to natural language input events;
    send, to a first component, a first request for parameters associated with the first feature computation;
    receive, from the first component, the parameters indicating that the first feature computation corresponds to aggregating a type of event within a first time window of interest;
    send, to a second component, a second request for first aggregation data corresponding to the type of event and the first time window of interest, the second component configured to store aggregation data corresponding to a timeline for a user profile, the timeline representing a plurality of interactions involving the user profile and a second system configured to process natural language inputs;
    receive, from the second component, the first aggregation data;
    process the first aggregation data using the first feature computation to generate first feature data, the first feature data representing first statistical values corresponding to the first time window; and
    associate the first feature data with the timeline.

14. The system of claim 13, wherein the memory further comprises instructions that, when executed by the at least one processor, further cause the system to:
  receive audio data corresponding to an utterance;
  determine, using the timeline and the first feature data, second feature data corresponding to the first feature computation and a second time window that includes the first time window;
  perform speech processing on the audio data to generate intent data corresponding to the utterance, wherein the speech processing uses the second feature data to generate the intent data; and cause an action to be performed using the intent data.

15. The system of claim 13, wherein the memory further comprises instructions that, when executed by the at least one processor, further cause the system to:
receive the first feature data; and
train, using the first feature data, at least one of:
an automatic speech recognition hypothesis reranker component,
a natural language understanding reranker component,
a rule-based machine learning component, or
a model-based machine learning component.

16. The system of claim 13, wherein the memory further comprises instructions that, when executed by the at least one processor, further cause the system to:
receive, at a first time, first event data corresponding to a first interaction involving the user profile and the second system, the first event data indicating the type of event;
send, to the first component, a third request for configuration data corresponding to the type of event;
receive, from the first component, the configuration data, wherein the configuration data indicates one or more types of information to extract from the first event data and that the first interaction corresponds to the timeline;
generate second event data using the first event data and the configuration data, the second event data corresponding to the first interaction, wherein the second event data represents the first time, the type of event, and a second time corresponding to the first interaction; and
associate the second event data with the timeline by storing the second event data in the second component.

17. The system of claim 13, wherein the memory further comprises instructions that, when executed by the at least one processor, further cause the system to:
generate, using the first feature computation, second feature data associated with a second time window subsequent to the first time window;
store the second feature data in the timeline;
receive, from the second system, a request for third feature data associated with the first feature computation and a third time window;
determine that the third time window comprises the first time window and at least the second time window;
identify, using the first feature computation and the first time window, the first feature data;
identify, using the first feature computation and the second time window, the second feature data;
determine the third feature data using the first feature data and the second feature data; and
send the third feature data to the second system.

18. The system of claim 13, wherein the memory further comprises instructions that, when executed by the at least one processor, further cause the system to:
receive first event data corresponding to a first interaction involving the user profile and the second system;
set a timer to a first time associated with the first event data;
process the first event data to generate second event data;
receive third event data corresponding to a second interaction involving the user profile and the second system, the second interaction occurring after the first interaction;
set the timer to a second time associated with the third event data;
determine a difference between the first time and the second time;
determine that the difference satisfies a condition; and
in response to the difference satisfying the condition, determine to perform the first feature computation.

19. The system of claim 13, wherein the memory further comprises instructions that, when executed by the at least one processor, further cause the system to:
receive first event data corresponding to a first interaction involving the user profile and the second system;
process the first event data to generate second event data;
associate the second event data with the timeline and a first time;
retrieve third event data from the timeline, the third event data associated with a second interaction involving the user profile and the second system that occurred prior to the first interaction;
set a timer to a second time associated with the third event data;
process the third event data to generate fourth event data;
associate the fourth event data with the timeline and the second time;
retrieve the second event data from the timeline;
determine the first time associated with the second event data;
set the timer to the first time;
determine a difference between the second time and the first time;
determine that the difference satisfies a condition;
in response to the difference satisfying the condition, determine to perform the first feature computation;
generate second feature data representing second statistical values corresponding to the first time window, the second feature data being different from the first feature data; and
store the second feature data in the timeline in place of the first feature data.

20. The system of claim 13, wherein the memory further comprises instructions that, when executed by the at least one processor, further cause the system to:
receive first event data corresponding to a first interaction involving the user profile and the second system, the first event data indicating the type of event;
send, to the first component, a third request for configuration data corresponding to the type of event;
receive, from the first component, the configuration data;
processing the first event data to generate second event data;
use the configuration data to identify that the second event data is associated with the timeline;
associate the second event data with the timeline by storing the second event data in a first storage device of the second component, the first storage device associated with a first amount of latency;
determine that a period of time has elapsed; and
store the second event data in a second storage device of the second component, the second storage device associated with a second amount of latency that is larger than the first amount.

* * * * *